(12) United States Patent
Colucci, III et al.

(10) Patent No.: US 10,242,333 B1
(45) Date of Patent: Mar. 26, 2019

(54) TRANSPORTING PACKAGES USING LIGHT GUIDED OPERATIONS

(71) Applicant: Amazon Technologies, Inc., Seattle, WA (US)

(72) Inventors: John Lewis Colucci, III, Seattle, WA (US); Jianwei Gao, Bellevue, WA (US); Xingang Guo, Clyde Hill, WA (US); Arun Prasath Sivakumaran, Issaquah, WA (US); Ian Ward, Seattle, WA (US); Prashant Singh Ahluwalia, Redmond, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 15/660,745

(22) Filed: Jul. 26, 2017

(51) Int. Cl.
| | |
|---|---|
| *G06F 17/30* | (2006.01) |
| *G06Q 10/08* | (2012.01) |
| *G06K 19/06* | (2006.01) |
| *G06Q 30/06* | (2012.01) |
| *H04L 29/06* | (2006.01) |
| *G06Q 30/00* | (2012.01) |
| *G06K 17/00* | (2006.01) |

(52) U.S. Cl.
CPC ..... *G06Q 10/083* (2013.01); *G06K 19/06028* (2013.01); *G06Q 30/0639* (2013.01); *H04L 69/16* (2013.01); *G06K 2017/0045* (2013.01); *G06Q 30/00* (2013.01)

(58) Field of Classification Search
CPC ...................................................... G06Q 10/083

USPC ....................................... 235/385; 340/539.12
See application file for complete search history.

(56) References Cited

U.S. PATENT DOCUMENTS

| | | | |
|---|---|---|---|
| 9,382,068 B1 | 7/2016 | Quan et al. | |
| 2006/0061469 A1* | 3/2006 | Jaeger | ............... B60R 25/00 340/539.13 |
| 2015/0055821 A1* | 2/2015 | Fotland | ............... G06K 9/3241 382/103 |
| 2015/0085096 A1* | 3/2015 | Smits | ................... G02B 23/02 348/78 |
| 2017/0169672 A1* | 6/2017 | Farrow | ............. G06K 7/10366 |
| 2018/0068266 A1* | 3/2018 | Kirmani | ............ G06Q 10/0833 |

* cited by examiner

*Primary Examiner* — Allyson Trail
(74) *Attorney, Agent, or Firm* — Patterson + Sheridan, LLP

(57) ABSTRACT

Embodiments presented herein describe a package management system that uses guidance devices when transporting packages. In one embodiment, the package management system includes an event detecting device that detects a package transporting event such as when a package is sorted into a container, a container is moved from the warehouse to vehicle, a container is moved from a vehicle into a warehouse, a package is delivered, a package is moved to a staging location, or a package is picked-up from a staging location. Once a container or staging location corresponding to the event is identified, a gateway identifies the guidance device assigned to that container or staging location and instructs the guidance device to illuminate a light disposed thereon.

20 Claims, 12 Drawing Sheets ved by humans. For example, a worker or associate in the warehouse may pick-up packages from a conveyor belt and identify, using the shipping label, an appropriate bin or container for the package. The bin may correspond to a particular zip code, region, or delivery company.

TRANSPORTING PACKAGES USING LIGHT GUIDED OPERATIONS

BACKGROUND

Shipping packages typically involves moving the packages to different locations in a shipping warehouse in preparation for the packages being loaded onto trucks. Although some of the package movement throughout the warehouse can be automated, much of the sorting is performed by humans. For example, a worker or associate in the warehouse may pick-up packages from a conveyor belt and identify, using the shipping label, an appropriate bin or container for the package. The bin may correspond to a particular zip code, region, or delivery company.

However, the associate may sometimes place the package in the wrong bin. For example, the bins may be stacked vertically with labels disposed above each bin. The associate may see the correct label but place the package in the bin above the label, when in fact the label corresponds to the lower bin. Mis-sorting packages can delay customer delivery by days and incur significant cost to rectify.

BRIEF DESCRIPTION OF DRAWINGS

Various embodiments in accordance with the present disclosure will be described with reference to the drawings, where like designations denote like elements.

DETAILED DESCRIPTION

Figure 1:
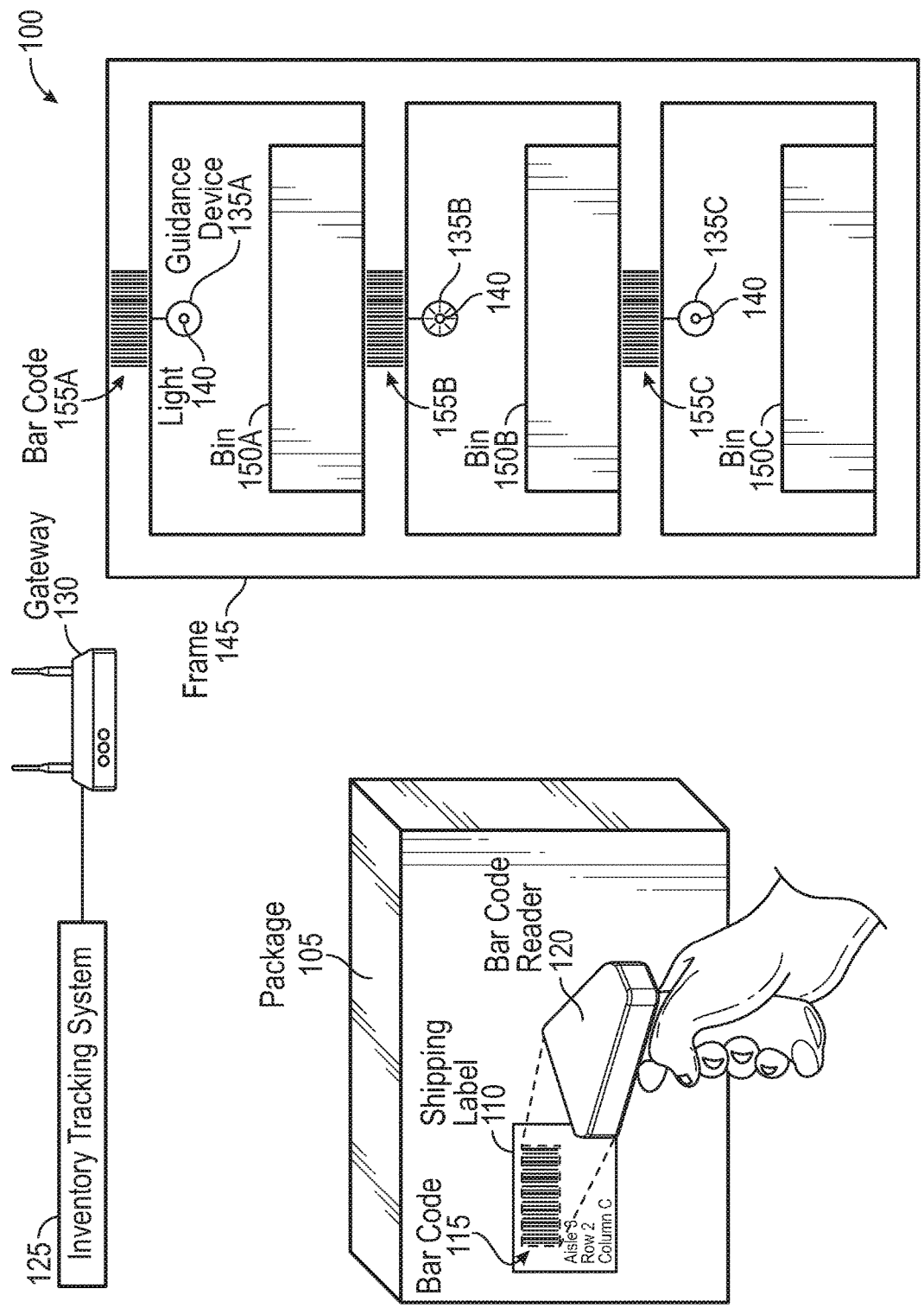
FIG. 1 illustrates a package management system for sorting packages using a guidance device, according to various embodiments.

Embodiments presented herein describe a package management system that uses guidance devices when transporting packages. In one embodiment, the package management system includes an event detecting device that detects a package transport event, such as when a package is sorted into a container, a container is moved from the warehouse to vehicle, a container is moved from a vehicle into a warehouse, or a package is delivered. For example, the event detecting device may trigger the event in response to a worker scanning a bar code, selecting a delivery route, or checking an electronic manifest.

The event detecting device informs an inventory tracking system of the package transport event which can track the location of the package, identify the destination of the package, and determine which container is currently holding the package. For example, if the event detecting device is a bar code reader which scans the bar code on a package, the inventory tracking system can determine which container or bin the associate should place the package. The inventory tracking system forwards this information to a gateway which is disposed in the warehouse and can communicate wirelessly with the guidance devices. The gateway identifies which guidance device is assigned to the destination container for the package and transmits an instruction to the guidance device to illuminate its light. The worker can then use the illuminated light to identify the container in which the package should be disposed. In this example, the associate does not need to use information on the shipping label to identify the container. Rather, the package management system can identify the correct container and then activate the light on the guidance device disposed on or near the container.

In another example, the event detecting device detects when a container (which can contain multiple packages) is being picked up—i.e., transported from the warehouse. For example, a delivery driver may have a paper manifest with bar codes or an electronic manifest which identifies which container or containers she should retrieve from the warehouse. By scanning the bar codes or by selecting the electronic manifest, the inventory tracking system can identify the containers and inform the gateway which containers should be picked up. In response, the gateway identifies the guidance devices assigned to those containers and instructs their lights to illuminate.

In another embodiment, the event detecting device detects when a vehicle has reached a delivery destination for a package (or a container) in the vehicle. For example, the event detecting device may use GPS to identify the current location of the vehicle and compare that location to delivery stops in a route. If the vehicle is at a stop on the route, the inventory tracking system can inform a gateway in the vehicle which container has a package to be delivered at the stop. The gateway identifies the guidance device corresponding to the container and instructs the guidance device to activate its light. In this manner, when retrieving the package, the delivery driver can quickly identify which container has the package. A similar process can be used when a driver delivers pallets to a warehouse. Once the event detecting device determines the vehicle has reached the warehouse, the inventory tracking system and the gateway (which can be in the truck or at a dock door of the warehouse) can identify which pallets that should be moved into the warehouse and illuminate the corresponding guidance devices.

In another embodiment, the package management system uses the guidance devices to determine if a container has moved to an incorrect destination. For example, using a paper or electronic manifest, the inventory tracking system determines that a container should be loaded onto a truck or moved to a particular location in the warehouse. The gateway can communicate with the guidance device on the container to determine its location in the warehouse or vehicle parked at a loading dock. If the container is at the incorrect location, the gateway can instruct the guidance device to illuminate (e.g., blink red) thereby informing the associate moving the container it is at the wrong location.

FIG. 1 illustrates a package management system 100 for sorting packages 105 using a guidance device 135, according to various embodiments. The package management system 100 includes an inventory tracking system 125 which tracks the location of the packages 105. Moreover, the inventory tracking system 125 can store container assignments for the packages 105 indicating where an associate should place the packages 105 during sorting. As shown, the associate uses a bar code reader 120 (e.g., an event detecting device) to scan a bar code 115 on a shipping label 110 for the package 105. The bar code reader 120 is communicatively coupled to the inventory tracking system, and thus, is informed when the bar code 115 is scanned. In response, the inventory tracking system 125 communicates with a gateway 130 which is wirelessly coupled to the guidance devices 135.

Although one gateway 130 is shown, a building (e.g., a warehouse) may have multiple gateways 130. For example, each gateway 130 may be assigned to manage guidance devices 135 in multiple aisles. Thus, when the inventory tracking system 125 identifies the package 105 using the information obtained by the bar code reader 120, the inventory tracking system 125 identifies the correct bin 150 for the package 105 and informs the gateway 130 that manages the aisle in which the bin 150 is disposed. In one embodiment, the inventory tracking system 125 communicates with the gateway using a local area network. However, in other embodiment, the inventory tracking system 125 is hosted on remote computing system (e.g., a data center or cloud computing environment) and communicates with the gateways 130 using a wide area network (e.g., the Internet).

In one embodiment, the gateway 130 identifies the guidance device 135 uniquely assigned to the bin 150 that is the intended destination for the package 105. The gateway 130 transmits an instruction to the assigned guidance device 135 to illuminate a light 140 on the device 135. In FIG. 1, the light 140 on the guidance device 135B is illuminated while the lights on guidance devices 135A and 135 C are not. Thus, when the associate carrying the package 105 stands in the aisle, she can identify the illuminated light 140 and dispose the package 105 in the assigned bin—i.e., the bin 150B. In one embodiment, each of the bins 150 includes a form factor that can contain multiple packages. For example, the bins 150 may have sturdy side walls and a base which permit the associates to stow multiple packages. Moreover, the bins 150 can be moved using, e.g., a pallet mover, to different locations when loaded with packages.

As shown, the bins 150 are supported by a frame 145 and stacked vertically three high. Although not shown, the frame 145 can extend to the left and right to include additional columns of three bins each. In one embodiment, multiple frames 145 extend parallel to each other where the space between the frames 145 establishes an aisle in the warehouse. Disposing three or more frames 145 in parallel establishes multiple aisles in the warehouse which may be given unique labels—e.g., Aisle 1, Aisle 2, Aisle 3, etc. In this example, the shipping label includes an aisle address (i.e., Aisle 3) which indicates the aisle containing the destination bin 150B for the package 105. Using the aisle address, the associate carries the package 105 to the correct aisle and then looks for the illuminated light 140 to identify the correct bin 150B.

As a backup, the shipping label also includes the row and column of the destination bin. That is, the destination bin 150B is located on Row 2, Column C of Aisle 3. Thus, if the inventory tracking system 125, gateway 130, or the guidance devices 135 malfunction or are otherwise unavailable, the associate can use the aisle, row, and column address on the shipping label 110 to sort the package 105.

When sorting the packages 105, the associate may also use the bar code reader 120 to scan a bar code 155 uniquely assigned to one of the bins after placing the package 105 in the bin. For example, after placing the package 105 in the bin 150B, the associate scans the bar code 155B disposed on the frame 145 above the bin 150B. The bar code reader 120 can again communicate this scan to the inventory tracking system 125 which can update the location to reflect that the package 105 is now stored in the bin 150B. However, relying on the associate to scan the bar code 155 after sorting the package 105 can result in error if, e.g., the associate forgets to scan the bar code, the scan does not register, or the associate scans the wrong bar code 155. Thus, in other embodiment, the package management system 100 relies on sensors in the guidance device 135 to confirm that the package 105 was placed in the correct bin 150.

In one embodiment, the package management system 100 is deployed in a warehouse used to sort packages according to their destination. For example, each bin 150 can be assigned to a particular geographic region—e.g., a postal zip code, a city block, a county, a state, or any other defined region. In another embodiment, the packages 105 are sorted according to the delivery method or company. For instance, the bins 150 may be assigned to different deliver companies, or the bin 150A may be for one-day air deliver while bins 150B and 150C are ground based delivery. The packages 105 may be transported to different delivery warehouses or shipping centers for further sorting. In another embodiment, the package management system 100 is used for preparing the packages 105 for "last-mile delivery" where delivery associates retrieve the packages 105 from the warehouse and directly deliver the packages 105 to the customer (i.e., the final destination of the package 105).

Figure 2:
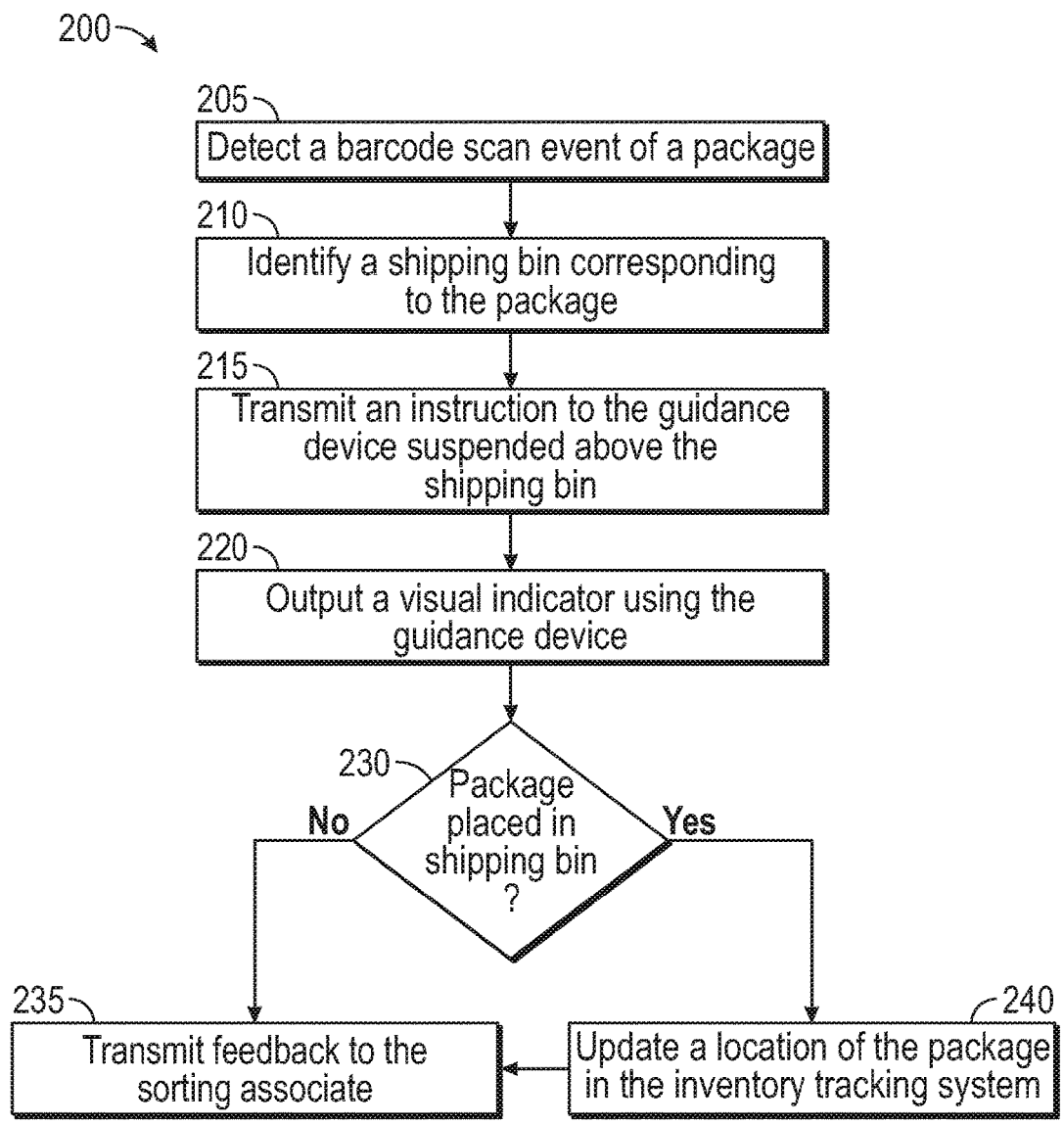
FIG. 2 is a flowchart for sorting packages using a guidance device, according to various embodiments.

FIG. 2 is a flowchart of a method 200 for sorting packages using a guidance device using the package management system 100 illustrated in FIG. 1, according to various embodiments. At block 205, the inventory tracking system detects a bar code scan of a package. In one embodiment, an associate uses the bar code reader (e.g., an event detecting device) to scan a bar code on a shipping label of a package she is about to sort. The scan is transmitted to the inventory tracking system using wireless and/or wired communication means. In one embodiment, the data retrieved from the scan includes a unique identification (ID) for the package.

At block 210, the inventory tracking system identifies a shipping bin (or sorting bin) corresponding to the package. For example, the inventory tracking system can use the unique ID provided by the bar code reader to parse into a database to identify a destination for the package. In one embodiment, the destination could be the final destination of the package—e.g., a shipping address—or an intermediate stop for the package such as a different warehouse. Using the destination, the inventory tracking system can identify the shipping bin in which the package should be disposed. For example, the inventory tracking system can identify the zip code of the package's destination and identify the bin assigned to that zip code. In another example, the destination may be the warehouse for a third-party delivery company in which case the inventory tracking system identifies the bin assigned to that company. In this manner, the inventory tracking system can correlate an ID of the package to a particular shipping bin.

Once the bin is identified, the inventory tracking system determines which gateway manages that bin (assuming a warehouse uses multiple gateways). For example, each gateway may manage tens or hundreds of guidance devices which are each uniquely assigned to one of the bins. In one embodiment, the inventory tracking system stores a data structure indicating which bin is assigned to which gateway in the warehouse. Once identified, the inventory tracking system can transmit an ID of the bin to the corresponding gateway.

At block 215, the gateway transmits an instruction to the guidance device suspended above the shipping bin in which the package should be disposed. To do so, the gateway identifies which guidance device is assigned to that bin using the bin ID. In one embodiment, the guidance devices have a one-to-one relationship with the bins in the warehouse where each guidance device is assigned to only one of the bins. As shown in FIG. 1, the guidance device is suspended over its assigned bin. However, in other embodiments, the guidance device may be disposed to the side of the bin on the frame or can be attached to the bin (e.g., on a surface of the bin facing the aisle). Regardless whether the guidance device is disposed on or near the container, the guidance device is disposed in a predefined spatial relationship with its assigned container so that an associate can easily correlate the guidance device to the correct container.

At block 220, the instruction sent by the gateway causes the guidance device to output a visual indicator. As mentioned above, the visual indicator can be a light which can be seen by the worker moving in the aisle. In one embodiment, the guidance device may output different colored lights and use predefined flashing patterns to attract the attention of the worker. For example, the guidance device may output green and red light in a flashing pattern or use a strobe light. Further, the guidance device may include multiple lights disposed on different surfaces which are illuminated in response to the instruction received from the gateway. In that way, the associate can see the emitted light from multiple directions (e.g., opposite ends of the aisle) in order to identify the corresponding bin.

In another embodiment, the guidance device includes a speaker for outputting audio such as a constant tone or a beep. The speaker could be used as a backup system in case the light or lights in the guidance device malfunction. In another example, the speaker can serve as a low battery indicator to signal when a battery in the guidance device is depleted and should be replaced so that the guidance device does not become nonfunctional.

In one embodiment, if a guidance device does fail (e.g., because of a depleted battery or a broken light or controller), the sorting associate can use the address information of the shipping label to identify the corresponding bin. Referring to FIG. 1, the shipping label 110 includes the aisle, row, and column information for the bin in which the package 105 should be disposed.

At block 230, the inventory tracking system determines whether the package was placed in the correct shipping bin. In one embodiment, after placing the package in the bin, the sorting associate uses the bar code reader to scan a bar code corresponding to the bin. For example, in FIG. 1, each bin 150 includes a corresponding bar code 155 disposed on a portion of the frame 145 above the bins 150. Before or after placing the package in the bin 150, the associate can scan the bar code 155 to inform the inventory tracking system which bin contains the package. However, requiring the associate to scan a bar code can introduce human error. For example, the associate may place the package in the bin 150B (which corresponds to the illuminated light 140 in the guidance device 135B) but scan the bar code 155C which is below the bin 150B and is assigned to the bin 150C. As such, the inventory tracking system 125 would incorrectly determine the package is in bin 150C when in reality the package was placed in the bin 150B.

Instead of relying on the associate to scan a bar code, the guidance devices can inform the inventor tracking system which bin contains the package. In one example, the guidance devices may include a sensor such as a vibration sensor, accelerometer, gyroscope, or light curtain which can detect when the associate has placed a package in the corresponding bin. For example, if the guidance device is attached to the bin, the vibration sensor on the guidance device can detect when a package was placed in the bin. Alternatively, if the guidance device hangs over the bin as shown in FIG. 1, the associate may be trained to always hit the guidance device when placing the package in the bin. The vibration sensor, accelerometer, or gyroscope in the guidance device can detect a motion resulting from the device being struck by the package (or the associate). In yet another example, the guidance device may emit a light curtain in a region between the top of the bin and the aisle such that a portion of the light curtain is broken when the associate places packages in the bin. In another embodiment, the guidance device includes a button which the sorting associate pushes when stowing the package. In any case, after detecting a package being stowed in the bin, the guidance device can inform the gateway which identifies the bin ID corresponding to the guidance device and reports that ID to the inventory tracking system. In this manner, the guidance device and gateway can automatically determine which bin includes the package.

If the inventory tracking system determines the package was placed in the correct bin, the method 200 proceeds to block 240 where the inventory tracking system updates a location of the package. For example, the inventory tracking system may assign the location of the package to the bin or to the location of the bin (e.g., the aisle, row, and column where the bin is located).

However, if the package was placed in the wrong bin (or the inventory tracking system was told the package was in the wrong bin), the method 200 proceeds to block 235 where the inventory tracking system transmits feedback to the sorting associate. In one embodiment, the inventory tracking system provides feedback using a mobile device carried by the associate such as a mobile phone, a tablet, an electronic wrist device, and the like. The mobile device may inform the sorting associate of the mistake and provide a remedial action such as retrieving the package from the incorrect bin and placing the package in the correct bin or confirming that the package was stowed in the correct bin and then scanning the correct bar code (in the case where the associate scanned the wrong bin bar code).

The method 200 can also proceed to block 235 after block 240. However, instead of instructing the associate to perform a remedial action, the inventory tracking system can provide confirmation that the action (i.e., stowing the package) was performed correctly. For example, the inventory tracking system may cause an electronic device carried by the associate to emit a confirmation sound or vibrate to inform the associate the package was stowed correctly and the location of the package has been updated.

Figure 3:
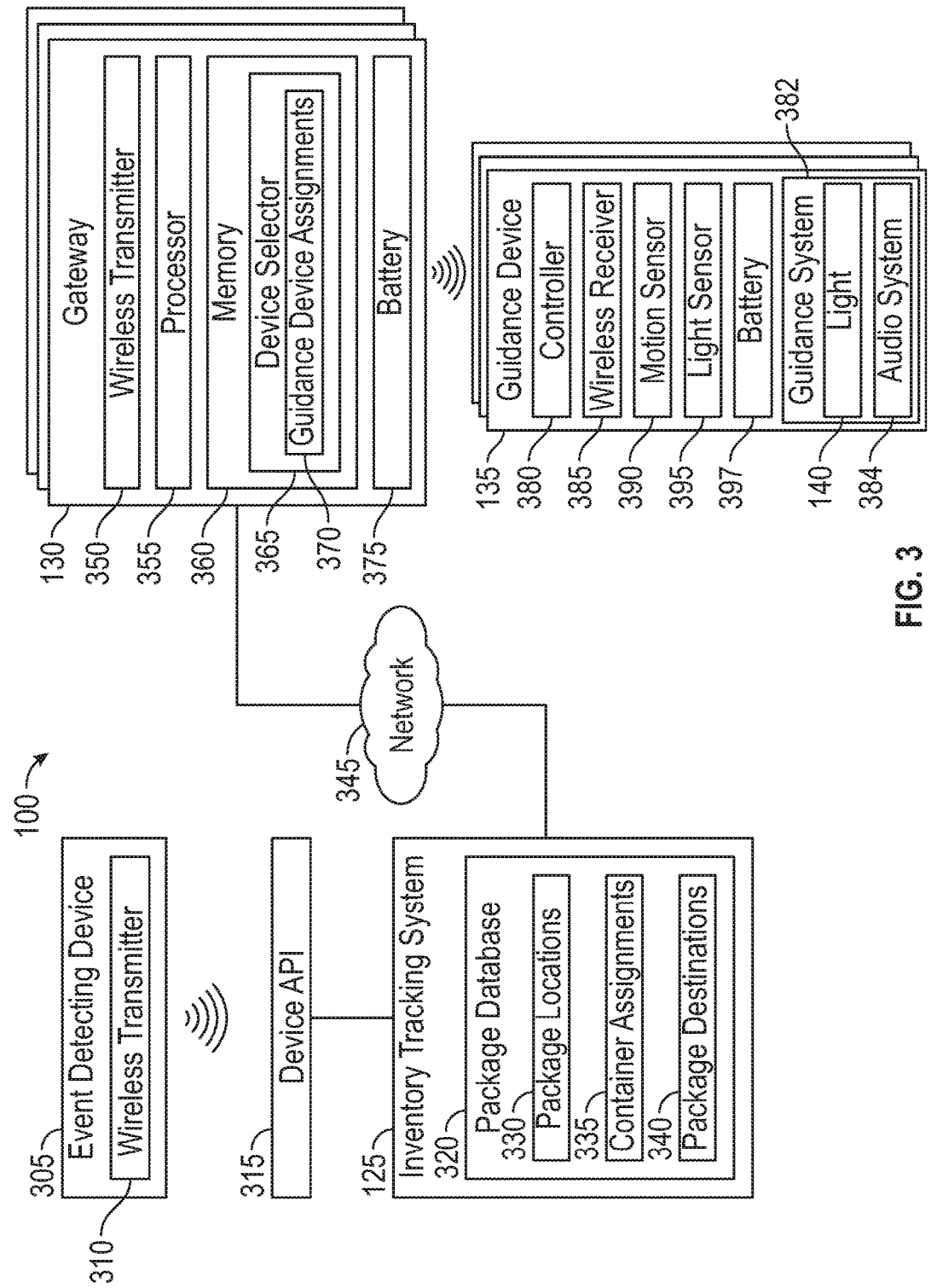
FIG. 3 is a block diagram of a package management system for transporting packages using guidance devices, according to various embodiments.

FIG. 3 is a block diagram of a package management system 100 for transporting packages using guidance devices 135, according to various embodiments. In addition to the guidance devices 135, the package management system 100 includes an event detecting device 305, a device application program interface (API) 315, the inventory tracking system 125, a network 345, and gateways 130. In one embodiment, the package management system 100 is in a fulfillment center where products are gathered and packaged in response to a customer order. The guidance devices 135 can be used to identify a product (or a bin of products) when an associate has to gather items for a customer order. In another embodiment, the system 100 is a sorting center which accepts packages that contain one or more items of a customer order and routes the packages to an appropriate dock door for pick up. In yet another embodiment, the package management system 100 is a last-mile delivery building or warehouse where packages are sorted and distributed to drivers who deliver the packages to customers. In this example, the guidance device 135 can be used by the drivers to identify their assigned packages. Further, the components in the package management system 100 can be distributed in different buildings or locations. For example, the event detecting device 305, the gateways 130, and the guidance devices 135 may be in a warehouse while the inventory tracking system 125 and the device API 315 operate in a data center or cloud computing environment.

The event detecting device 305 can include a bar code reader as shown in FIG. 1 which a sorting associate uses to scan a shipping label when stowing a package. In another embodiment, the event detecting device 305 can be a mobile device carried by the associate (e.g., a mobile phone or tablet) which can select bins or bags that should be picked up for delivery. For example, the associate may use a software application on a mobile phone to select a delivery route, and in response, the package management system 100 can use the guidance devices 135 to indicate which bags or bins correspond to that route.

The event detecting device 305 includes a wireless transmitter 310 which permits the device 305 to communicate with the device API 315. In one embodiment, the device API 315 provides an interface for communicating between the inventory tracking system 125 and the event detecting device 305. For example, if the event detecting device 305 is a bar code reader, the device API 315 may be a portal that can transmit data received from the reader to the inventory tracking system 125 and vice versa. For example, the device API 315 may reformat the data received from the bar code reader into a format that is understandable to the inventory tracking system 125. Although shown as being external to the event detecting device 305, in other embodiments, the device API 315 is disposed on the event detecting device 305 or the inventory tracking system 125. For example, if the event detecting device 305 is a tablet computer, the device API 315 may be a software application executing on the device 305 which enables communication with the inventory tracking system 125.

The inventory tracking system 125 can include hardware elements, software elements, or a combination of both. In one embodiment, the inventory tracking system 125 is a computing system disposed in a warehouse with the gateway 130 and the guidance device 135 but in other embodiments may be hosted by a data center or a cloud computing environment. As shown, the inventory tracking system 125 includes a package database 320 for tracking packages and containers (e.g., a bin or bag). To do so, the package database 320 stores package locations 330 which indicate the current location of the package (or a container which contains multiple packages), container assignments 335 indicating in which container the packages should be disposed in, and package destinations 340 which can indicate the desired destination of the package. The package destinations 340 can include the final destination of the package (e.g., the address of the customer who ordered the items in the package) or multiple hops the packages traverse before reaching their final destinations. In one embodiment, the inventory tracking system 125 uses the package destinations 340 to generate shipping labels which are placed on the packages. The shipping labels can include a bar code (as shown in FIG. 1), a mailing address, and/or a sorting location (e.g., a bin location in a warehouse).

The package management system 100 can use the container assignments 335 to identify which guidance devices 135 should be illuminated when performing a sort action, a pick-up action, or a delivery action. Referring to FIG. 1, after scanning the bar code 115, the inventory tracking system 125 can identify the package and determine in which bin the package should be sorted using the container assignments 335. The inventory tracking system 125 can forward the bin ID to the appropriate gateway 130 which, in response, instructs the guidance device 135 assigned to the bin to provide a visual indication.

As shown, the inventory tracking system 125 is communicatively coupled to the gateway 130 via the network 345. If the inventory tracking system 125 and the gateway 130 are disposed in the same building or campus, the network 345 may be a local area network or a private network. However, if the inventory tracking system 125 is hosted by a remote data center or a cloud computing environment, the network 345 can be a wide area network.

The gateway 130 includes a wireless transmitter 350, a processor 355, a memory 360 and a battery 375. In one embodiment, the gateway 130 includes a chassis or a body (not shown) which contains these hardware components. The chassis may include mounting elements that permit the gateway 130 to be fixable attached to a roof or wall of a warehouse or to a frame of an aisle. When mounted in the warehouse, the battery 375 may not be used and instead the gateway 130 may include an electrical connection to a power grid. In another embodiment, the mounting element and the battery 375 may permit the gateway 130 to be mobile such that the gateway 130 can be attached to different surfaces and operate in a vehicle. For example, hook and loop fasteners, suction cups, or magnets can be used to removably mount the gateway 130 to different surfaces. For instance, the gateway 130 may be mounted to the roof or wall of a vehicle used to deliver the packages. In this example, the wireless transmitter 350 may communicate with a cellular network (i.e., network 345) to communicate with the inventory tracking system 125.

The processor 355 represents any number of processing elements which each can include any number of processing cores. The memory 360 can include non-volatile and volatile memory elements. As shown, the memory 360 stores a device selector 365 which identifies which container (e.g., a bin or bag) is assigned to which one of the guidance devices 135 using guidance device assignments 370. That is, in one embodiment, the guidance device assignments 370 (e.g., a data structure or database) assign each of the guidance devices 135 to a container in a one-to-one relationship such that each guidance device 135 is uniquely assigned to one of the containers. Thus, when the inventory tracking system 125 sends a container ID, the gateway 130 can identify the corresponding guidance device 135 using the guidance device assignments 370.

In another embodiment, the guidance device assignments 370 may be stored in the inventory tracking system 125 instead of the gateway 130. In that case, the inventory tracking system 125 can send an ID of the guidance device 135 to the gateway 130 instead of the container ID. If there are multiple gateways 130 in a warehouse, the inventory tracking system 125 can store a list that indicates which guidance devices (or containers) each of the gateways 130 manages or is assigned to. The inventory tracking system 125 can use the list to identify which gateway 130 should receive the guidance device ID or container ID.

The guidance device 135 includes a controller 380, a guidance system 382, a wireless receiver 385, a motion sensor 390, a light sensor 395, and a battery 397. The controller 380 can include a micro-controller or a circuit board which contains one or more integrated circuits for performing the functions described herein. The controller 380 may also include firmware.

The guidance system 382 includes output devices or systems for providing guidance to an associate. In one embodiment, the guidance system 382 directs the associate to the container assigned to the guidance device 135 when performing a stow, pick-up, delivery, loading or unloading event. The guidance system 382 includes the light 140 and an audio system 384. The light 140 may be an incandescent bulb, a light emitting diode (LED), or a strobe. Moreover, the guidance device 135 can include multiple lights that can be disposed in a pattern on the same surface. Additionally or alternatively, the lights can be disposed on different surfaces with different angles. For example, the guidance device can have a form factor or a body in the shape of a box in which light sources can be disposed on multiple sides of the box so that a sorting associate can identify an illuminated light from different locations relative to the guidance device 135. In one embodiment, the controller 380 can drive the light 140 with a constant intensity, varying intensities, a flickering pattern, different colors, and the like.

The audio system 384 can include a speaker for outputting sound as well as a memory for storing predefined commands. In one embodiment, the commands are used to identify the assigned container, provide feedback to the associate, or indicate a problem with the guidance device 135 such as a low battery or that the device 135 is unable to communicate with the gateway 130.

The wireless receiver 385 permits the guidance device 135 to communicate with the gateway 130. In one embodiment, the wireless receiver 385 may use a low-power communication system which preserves battery life and enables wireless communication for ranges from 0-1000 meters. Although a wireless receiver is shown, in one embodiment, the guidance device 135 includes a wireless transmitter (or a transceiver) for transmitting data to the gateway 130. For example, if the battery level is low or the motion sensor 390 or the light sensor 395 malfunction, the controller 380 can use the transmitter to inform the gateway 130 which can contact a service technician. In another embodiment, the controller 380 can use the transmitter to forward data generated by the motion sensor 390 and light sensor 395 regarding human activity near the guidance device 135 to the gateway 130.

In one embodiment, the motion sensor 390 (e.g., a vibration sensor, an accelerometer, or gyroscope) and the light sensor 395 (e.g., a light curtain or light motion sensor) can detect when a package is placed in the corresponding container, when an associate is standing in front of the container, or if the container is being moved or carried (assuming the guidance device 135 is attached to the container). After reporting this information, the inventory tracking system 125 can update the package locations 330 to indicate the package is in a particular container or to indicate that the package is in transient (e.g., if the container is being moved).

Figure 4:
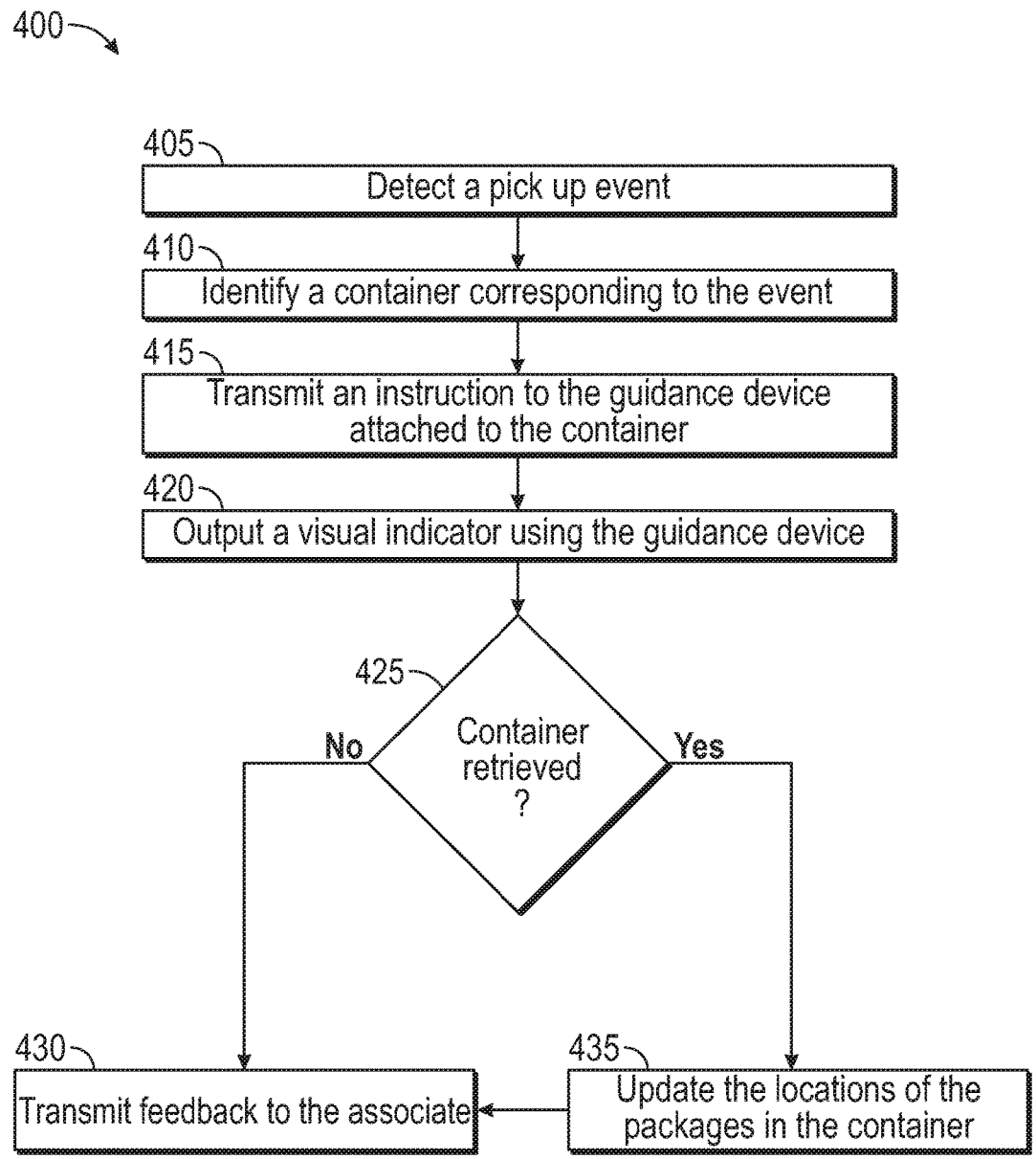
FIG. 4 is a flowchart for retrieving a container using a guidance device, according to various embodiments.

FIG. 4 is a flowchart of a method 400 for retrieving a container using a guidance device, according to various embodiments. At block 405, the event detecting device detects a pick-up event (e.g., a package transport event). In one embodiment, the pick-up event is a request to move packages from a first location to a second location. For example, a sorting associate may use a bar code reader to scan a bar code on a paper manifest which indicates the containers corresponding to a particular delivery route. In another example, a delivery driver can use a mobile device to select a particular route. In yet another example, a pallet driver can scan a bar code of a pallet she has been assigned to move.

At block 410, the inventory tracking system uses information corresponding to the pick-up event to identify a container corresponding to the event. As shown in FIG. 3, the inventory tracking system 125 stores the container assignments 335 which indicate which container the packages are stored. Moreover, the inventory tracking system can store general information about the containers such as a geographic region corresponding to the containers (e.g., a zip code or city block) or a delivery company responsible for delivering the packages in the containers. Using this information, the inventory tracking system identifies the containers corresponding to the pick-up event. For example, if the pick-up event requires an associate to collect packages for a particular route, the inventory tracking system identifies all the bags containing packages to be delivered on that route. If the pick-up event is triggered by a delivery driver who is retrieving packages assigned to be delivered by a particular delivery company, the inventory tracking system identifies all the containers assigned to that company.

In one embodiment, the inventory tracking system transmits a container ID (or IDs) to the gateway. The containers can all be managed by the same gateway or by different gateways. For example, the pick-up event may require an associate to retrieve a bin from aisle A which is managed by Gateway 1 and a bin from Aisle E which is managed by Gateway 6. In that example, the inventory tracking system identifies which container is managed by which gateway and sends the corresponding instructions. In another embodiment, however, the inventory tracking system may not know what gateway manages which of the containers. Instead, the inventory tracking system may transmit a broadcast message with a list of the containers corresponding to the pick-up event to all the gateways in the warehouse. Each gateway can determine which of those containers it manages (if any).

At block 415, the gateway transmits an instruction to the guidance device attached to the container corresponding to the pick-up event. In one embodiment, the guidance devices are permanently attached to the containers and can be integrated into the form factor of the containers. For example, the guidance devices may be stitched into an outer fabric of a bag containing the packages. In another example, the guidance devices are glued to an outer surface of the containers. Alternatively, the guidance devices may be removable attached to the containers. For example, the guidance devices may include a clip or suction cups that couple to a side of the container. In another example, the guidance device and the container may include respective mounting elements such as magnets or hooks and loops for mounting the guidance device on to the container. As such, the guidance device can easily be removed and replaced if, e.g., the guidance device malfunctions or has a depleted battery.

At block 420, the guidance device outputs a visual indicator to indicate that the attached container corresponds to the pick-up event. As mentioned above, the guidance device can include any number of lights and use any type of color, intensity, flicker, or illumination pattern. Moreover, the guidance device can also use audio output to identify the container.

In one embodiment, the gateway may instruct the guidance device to output a unique color or pattern to identify the pick-up event from other events. For example, at the same time a first associate is collecting the containers for a first delivery route, a second associate is collecting different containers for a second delivery route. If the guidance devices attached to the containers assigned to the first and second routes use the same color or illumination pattern, the first and second associates may not know if the containers with the illuminated guidance devices apply to the first delivery route or the second delivery route. Instead, the gateway (or the inventory tracking system) can assign a unique color or pattern for each event which is on-going. For example, a sorting event that occurs in parallel with a pick-up event may be assigned green while the pick-up event is assigned red. Using a feedback device (e.g., a mobile phone, a tablet computer, an electronic wristwatch, or a display mounted on a pallet mover), the gateway or inventory tracking system can inform the associate the color or illumination pattern assigned to her event. After an event completes—e.g., after the associate has collected all the containers for the pick-up event—the color or illumination pattern assigned for that event can be assigned to a new event.

At block 425, the inventory tracking system determines if the container (or containers) corresponding to the pick-up event was retrieved. For example, the associate may scan a bar code on the container to indicate which bag was retrieved. In another example, a motion sensor in the guidance device may detect that the container is moving and inform the inventory tracking system via the gateway. In yet another example, the inventory tracking system may use an RFID tag on the container, on a package in the container, or in the guidance device, and an RFID reader to determine if the correct container was retrieved.

If the correct container was retrieved, the method 400 proceeds to block 435 where the inventory tracking system updates the locations of the packages in the container. For example, the inventory tracking system may indicate that the packages are in transient or have been retrieved by an associate for delivery on a particular route. If, however, the correct container was not retrieved, the method 400 proceeds to block 430 where the inventory tracking system transmits feedback to the associate using any of the techniques described in block 235 of FIG. 2. Moreover, the method 400 can also proceed to block 430 after block 435. However, instead of instructing the associate to perform a remedial action, the inventory tracking system can provide confirmation that the action (e.g., picking up the package or container) was performed correctly.

Figure 5:
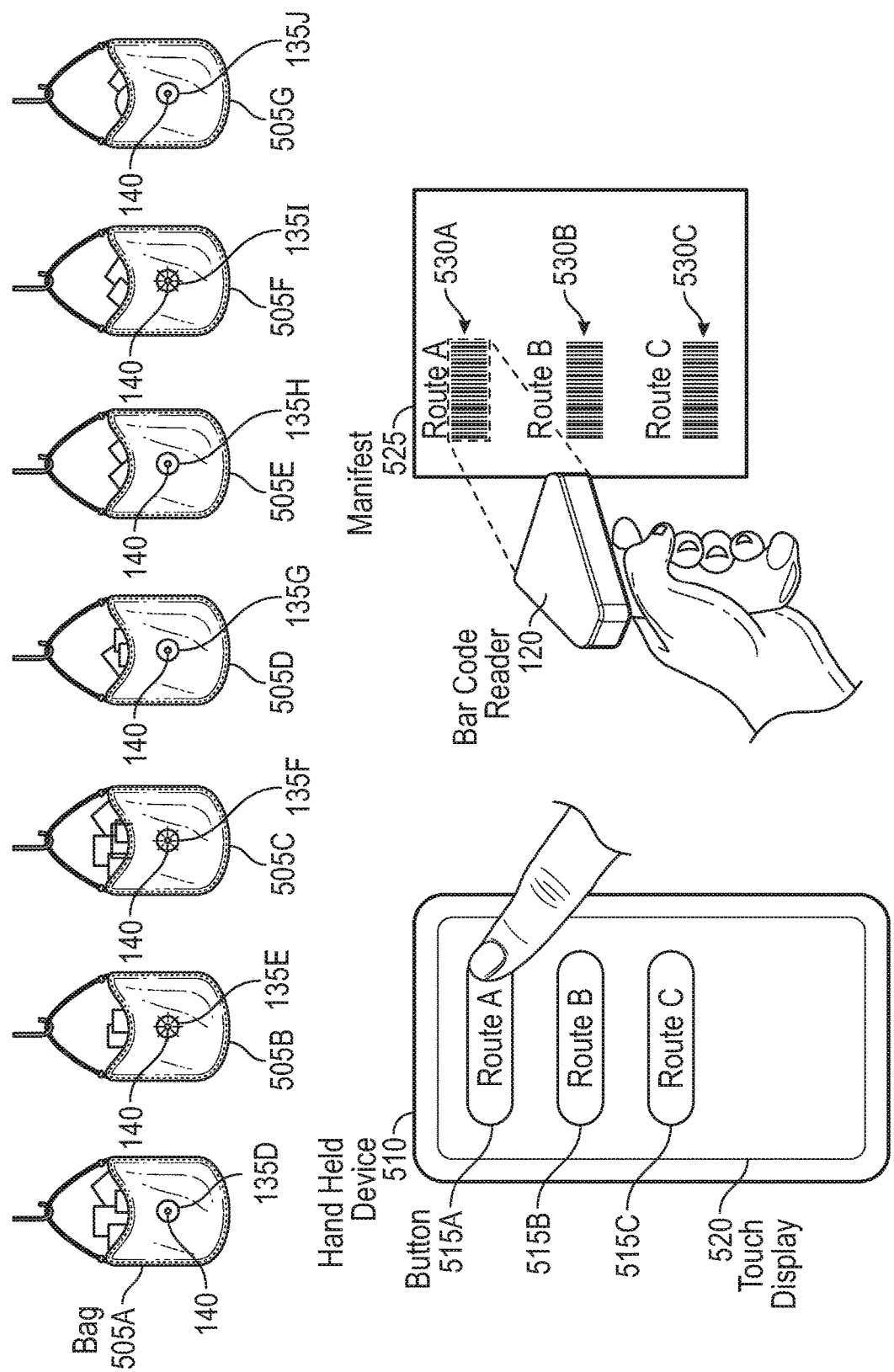
FIG. 5 illustrates a package management system for retrieving containers using guidance devices, according to various embodiments.

FIG. 5 illustrates a package management system 500 for retrieving containers using guidance devices 135, according to various embodiments. In this embodiment, the containers are bags 505 which are hung along a wall. Each of the bags 505 can contain any number of packages. In one embodiment, all the packages in a bag may have a common trait such as being assigned to the same delivery route, correspond to the same geographic location, are assigned to the same delivery driver, or have a same delivery priority (e.g., overnight delivery versus 3-day ground delivery).

When an associate or delivery driver comes to pick up one or more of the bags for delivery, the associate can use a hand held device 510 or a paper manifest 525 to trigger a pick-up event as discussed in FIG. 4. For example, the hand held device 510 may be a mobile computing device which has a touch display 520 which permits the associate to select which route she is assigned to using the buttons 515. In another embodiment, instead of being a mobile device, the device 510 can be fixably attached and as associates arrive to pick up the bags 505 for their routes, use the buttons 515 to select which route they are assigned. In another embodiment, the buttons 515 may correspond to user or employee IDs rather than delivery routes.

When using the paper manifest 525, the associate uses the bar code reader 120 to scan a bar code 530 which corresponds to one of the routes. Regardless whether the pick-up event is triggered using the hand held device 510 or the bar code reader 120, the inventory tracking system uses the information generated by the event detecting device to select which of the bags 505 correspond to the selected route (e.g., block 410 of method 400). In FIG. 5, a gateway (not shown) determines the guidance devices 136 corresponding to the bags assigned to the route (i.e., the guidance devices 135E, 135F, and 135J) and instructs those guidance devices 135 to illuminate their lights 140 which indicate to the associate that the bags 505B, 505C, and 505F are assigned to the selected route. These actions correlate to blocks 415 and 420 of method 400.

Using the illuminated lights, the associate can retrieve the correct bags 505. Thus, the associate does not need to cross-correlate IDs on the bags with a manifest to ensure she has retrieved the correct ones. Further, the associate which collects the bags 505 for the routes does not need to hang the bags 505 in any particular location or order (to indicate which route they belong to) since the package management system 500 can use the guidance device 136 to indicate to the delivery associate which bags 505 correspond to her route.

In one embodiment, the package management system 500 can use the guidance devices 136 to handle multiple pick-up events in parallel. For example, the gateway can instruct the guidance devices 135E, 135F, and 135J to output a green light 140 corresponding to Route A while the guidance devices 135D and 135G output a red light 140 corresponding to Route B. In this manner, two delivery associates can identify the bags 505 they should retrieve from the hooks at the same time.

In another embodiment, the package management system 500 uses the guidance devices 136 to identify pallets which should be loaded onto a truck from a staging area. The staging area may include pallets that are intended for different loading docks or should be shipped using the same loading dock but on different trucks. An associate can use the hand held device 510 or scan a bar code 530 on the manifest 525 to illuminate the guidance devices on the pallets that should loaded onto the truck. Thus, the associate can easily identify which of the pallets in the staging area should be loaded onto the truck and which should not.

In another embodiment, the package management system 500 uses the guidance devices 136 to ensure that the correct containers are loaded into a delivery vehicle. For example, when loading pallets into a truck, the truck driver can ensure that all the guidance devices on the pallets in the truck are illuminating the same color of light or have the same illumination pattern. If so, the truck driver knows that no pallets were inadvertently loaded onto her truck. For example, before closing the door of the truck, the truck driver may send a confirmation event using the hand held device 510 which triggers the package management system 500 to illuminate the guidance devices and confirm no pallets were mistakenly loaded onto the truck.

In one embodiment, when retrieving the bags 505 for a particular route, the delivery associates may also pick-up a mobile gateway which can be placed in the vehicle used to make the deliveries. Thus, the guidance devices 136 can also be used to help the associate to deliver the packages to their next stop, whether to customers or to another warehouse or distribution center.

Figure 6:
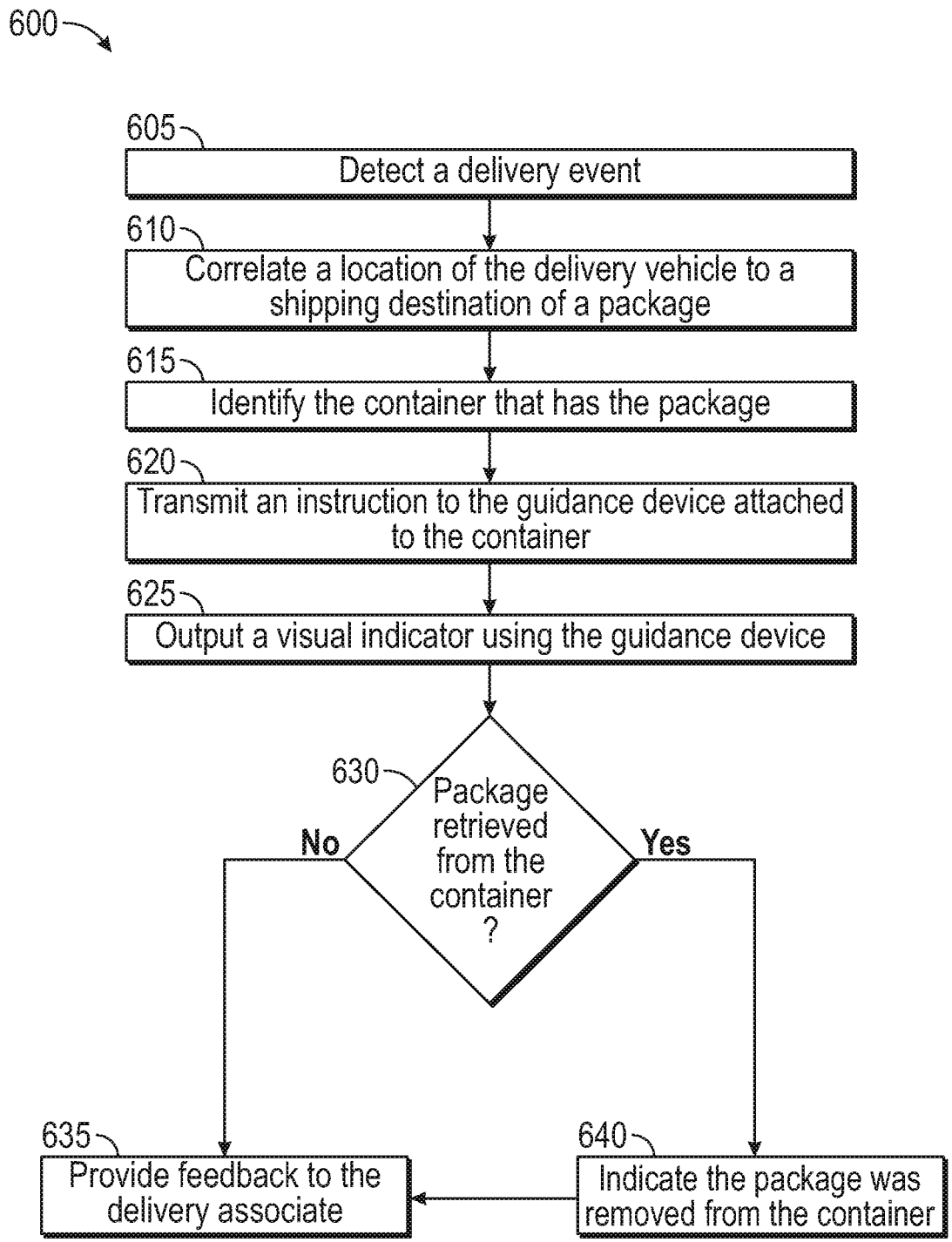
FIG. 6 is a flowchart for delivering packages using a guidance device, according to various embodiments.

FIG. 6 is a flowchart of a method 600 for delivering packages using a guidance device, according to various embodiments. At block 605, the event detecting device detects a delivery event (e.g., a package transport event). In one embodiment, the event detecting device is a mobile device which is location aware (e.g., has a GPS system). Using its derived location, the mobile device can determine where on a delivery route the device (and by proxy, the vehicle) is currently located. For example, the delivery route may include one stop or multiple stops.

At block 610, the inventory tracking system correlates a location of the delivery vehicle to a shipping destination of a package. In one embodiment, a software application executing on the mobile device can determine, using the derived location, when the mobile device is at one of the stops along the delivery route and inform the inventory tracking system. In response, the inventory tracking system can identify the package or packages that should be delivered at that stop.

At block 615, the inventory tracking system identifies the container which contains the package or packages. In some embodiments, the packages may be stored in multiple containers in which case the inventory tracking system provides multiple container IDs to the mobile gateway disposed in the delivery vehicle. For example, the mobile gateway may use a cellular network service to communicate with the inventory tracking system to receive the container IDs.

However, the gateway does not need to be in the vehicle to perform method 600. For example, the stop may be at a warehouse where certain pallets are being dropped off (but other pallets remain on the truck). In this example, instead of putting a gateway on the truck, the gateway could be disposed at or near the loading dock door such that the gateway can communicate with the guidance devices disposed on the pallets in the truck when the truck is parked at the loading dock.

At block 620, the gateway transmits an instruction to the guidance device attached to the container that has the package to be delivered at the stop. At block 625, the guidance device outputs a visual indicator to indicate to the driver which container has the package. Thus, if the vehicle has multiple containers, the driver can use the illuminated guidance device to quickly identify the correct container and then search through the container to identify the package (or packages). If dropping off containers (e.g., pallets) at the delivery stop, a pallet mover can use the illuminated guidance devices to identify which pallets should be moved off the truck and which pallets should remain (i.e., the pallets whose attached guidance devices are not illuminated).

At block 630, the inventory tracking system determines if the correct package was delivered. For example, the delivery associate may scan the bar code on the shipping label of the package to inform the inventory tracking system what package is being delivered. In another example, a vibration sensor in the guidance device can report to the inventory tracking system if the container was disturbed by the associate when retrieving the package from the container. If an entire container is being delivered, a motion sensor or a button on the guidance device, or an RFID system can indicate if the correct container is being moved.

If the correct package or packages were delivered, the method 600 proceeds to block 640 where the inventory tracking system updates the location of the delivered package or packages. If, however, the correct container was not retrieved, the method 600 proceeds to block 430 where the inventory tracking system transmits feedback to the associate using any of the techniques described in block 235 of FIG. 2. For example, if the associate retrieved the package from the wrong container, the inventory tracking system may instruct the gateway to illuminate the guidance device on the correct container. If the associate moved the wrong container, the inventory tracking system can instruct the gateway to cause the guidance device on the wrong container to flash red (and output an audio warning) while instructing the guidance device on the correct container to flash green.

Moreover, the method 600 can also proceed to block 635 after block 640. However, instead of instructing the associate to perform a remedial action, the inventory tracking system can provide confirmation that the action (e.g., delivering the package) was performed correctly.

Figure 7:
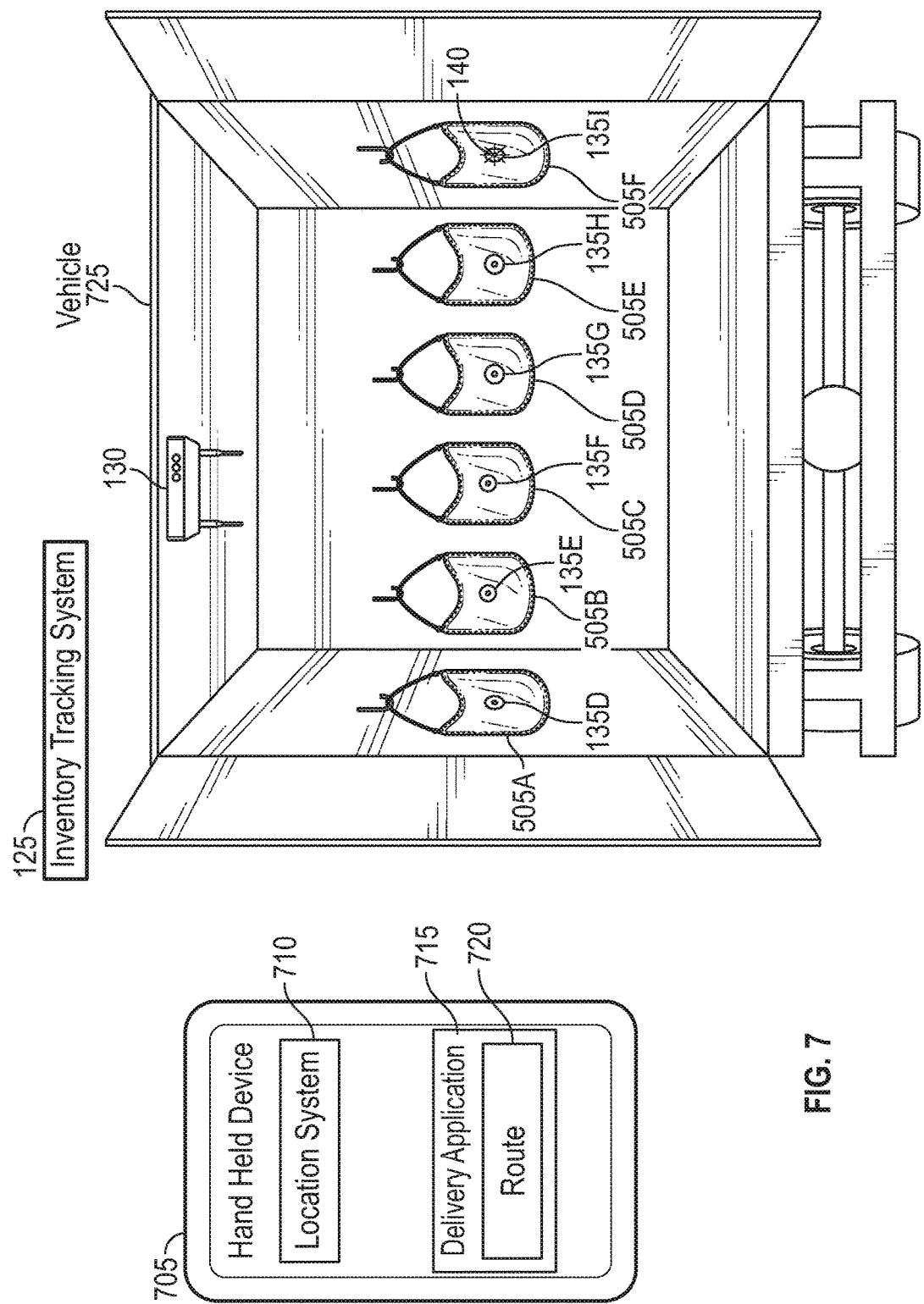
FIG. 7 illustrates a package management system for delivering packages using guidance devices, according to various embodiments.

FIG. 7 illustrates a package management system for delivering packages using guidance devices, according to various embodiments. In FIG. 7, the gateway 130 is a mobile gateway that is mounted on the ceiling of a vehicle 725. In one embodiment, the gateway 130 may have its own battery supply and is removably attached to the vehicle 725 using, for example, hook and loop fasteners, suction cups, or magnets. In another embodiment, the gateway 130 is fixably attached to the vehicle 725 using, for example, screws or glue and receives power from a power source in the vehicle 725 (e.g., an alternator or generator).

The package management system also includes a hand-held device 705 which has a location system 710 and a delivery application 715. The location system 710 can determine a real-time location of the hand-held device 705 which is carried by the driver of the vehicle 725. Thus, the location of the hand-held device 705 can be imputed to the location of the vehicle 725 (and the bags 505 in the vehicle 725). In one embodiment, the location system 710 is a GPS system, but the system 710 may use other means such as cellular network towers or Wi-Fi to determine a location of the hand-held device 705.

The delivery application 715 uses the location generated by the location system 710 to track the progress of the vehicle 725 on a delivery route 720. In one example, the delivery route 720 may include a plurality of stops where one or more of the packages (or a bag 505) should be delivered. In one embodiment, the route 720 includes directions for guiding the driver between the stops.

When the delivery application 715 determines the current location of the hand-held device 705 (and thus, the vehicle 725) is at one of the stops on the route 720, the delivery application 715 generates a delivery event and informs the inventory tracking system 125. In one embodiment, the inventory tracking system 125 determines which packages or bags are assigned to that stop. Alternatively, the delivery application 715 may already have this information and forward it to the inventory tracking system 125. If a package is to be delivered (instead of an entire bag or pallet), the inventory tracking system 125 identifies the bag 505 storing the package and transmits the bag ID to the gateway 130 using, for example, a cellular network. In response, the gateway 130 can instruct the guidance device 135 assigned to the identified bag 505 to illuminate. In FIG. 7, the package is located in bag 505G, and thus, the light 140 on the guidance device 135I is illuminated.

In another embodiment, the hand-held device 705 may communicate directly with the gateway 130 (without communicating with the inventory tracking system 125). For example, if the delivery application 715 knows which packages are stored in each of the bags 505, the delivery application 715 can forward this information to the gateway 130. However, after the package is retrieved and delivered, the inventory tracking system 125 may be informed so the system 125 can mark the package as delivered in the package database.

Figure 8:
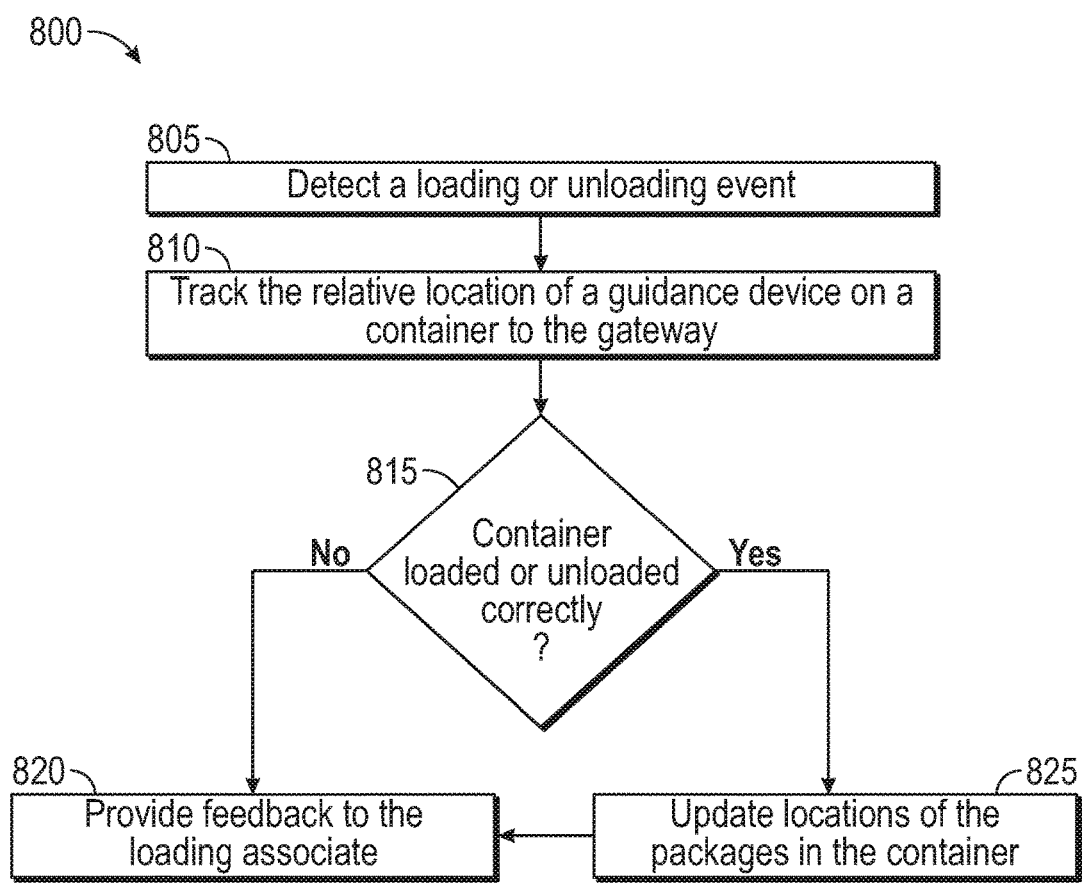
FIG. 8 is a flowchart for determining whether a container is correctly loaded or unloaded using a guidance device, according to various embodiments.

FIG. 8 is a flowchart of a method 800 for determining whether a container is loaded or unloaded correctly using a guidance device, according to various embodiments. At block 805, the event detecting device detects a loading or unloading event (e.g., a package transport event). For example, the loading event may be triggered by a driver scanning a manifest to pick up pallets from a staging area. An unloading event may be triggered when a driver indicates she has arrived at a warehouse to pick up packages. The unloading event may be detected by a location aware device carried by the driver or after the driver scans a manifest.

At block 810, the gateway tracks the relative location of a guidance device on a container. The gateway may contain a tracking system which determines a distance between the gateway and the guidance devices. In one embodiment, the tracking system can be the event detecting device which determines when a container is being loaded or unloaded from a vehicle in response to a change in the distance between the guidance device and the gateway. When the tracking system determines this distance is changing, the tracking system can inform the inventory tracking system.

When moving pallets from a staging area onto a truck, the gateway may monitor all the guidance devices in the staging area (not just the ones assigned to be loaded onto the truck). If one of the pallets not assigned to the route is being moved (i.e., the distance between the gateway and the corresponding guidance device is changing), the gateway can determine that the wrong pallet is being loaded onto the truck.

In another example, the gateway monitors the distance only to the guidance devices that should be loaded onto the truck to make sure they are changing, thereby indicating the corresponding containers are being loaded onto the truck. However, if the distances do not change after a predetermined time (e.g., 1-5 minutes) or after the driver confirms that the containers were loaded onto the truck, the gateway may inform the inventory tracking system that in fact not all the containers were properly loaded.

In another embodiment, the gateway can determine if the container was loaded onto the correct vehicle. Stated differently, in addition to determining if the associate is moving the correct container, the gateway can determine if the container was moved into the correct vehicle. For example, the gateway may know the distance from itself to the correct vehicle. If, however, the guidance device stops moving at a distance that is less than or greater than the expected distance, the gateway can inform the inventory tracking system that the container was moved to the incorrect vehicle. Instead of using a set distance, the gateway may use a range of distances since the container may be stored at varying locations within the vehicle. For example, so long as the guidance device is between 30 to 40 meters from the gateway, the gateway determines the corresponding container was loaded onto the correct vehicle. If the guidance device stops at a location outside of that range, the inventory tracking system may transmit a warning message to an associate and ask her to confirm that the container was moved into the correct vehicle. When doing so, the gateway may illuminate the guidance device to help the associate to identify the container.

When unloading containers, the gateway can track the relative distances to the guidance devices on the containers that should be removed from the vehicle. If those guidance devices do not begin to move after a predefined time period or after the driver indicates the delivery is complete, the gateway can inform the inventory tracking system. The gateway can use the lights on the guidance devices to indicate to the driver which of the containers still need to be removed from the vehicle. Similarly, if the gateway determines that the distance to a guidance device on a container that should not be moving is changing, the gateway can inform the inventory tracking system that the associate is moving a wrong container.

Moreover, the gateway can continue to track the guidance devices after leaving the vehicle. For example, if the associate should drop the container off at a particular location in the warehouse (and assuming the gateway knows the distance from itself to that location), after the guidance device stops moving, the gateway can determine if the distance between itself and the guidance device matches the distance from the gateway to the desired location (or is within a predefined range of distances). If not, the gateway can inform the inventory tracking system that the associate likely dropped the container off at the wrong location.

At block 815, the inventory tracking system determines whether the container was loaded or unloaded correctly. As mentioned above, using the relative distances to the guidance devices, the gateway can detect when the wrong container is loaded into the vehicle, when the correct container was never loaded, or when the correct container was loaded onto the wrong vehicle. The gateway can also detect when the wrong container is unloaded from the vehicle, when the correct container was never unloaded, or when the correct container was unloaded but dropped off at the wrong location in the warehouse.

The package management system can also use other systems to ensure the correct container was loaded into, or unloaded from, the vehicle. For example, an RFID portal may be disposed at the dock door which reads RFID tags disposed in the guidance devices. As the container is loaded into the vehicle or removed from the vehicle, the RFID portal can read the tag and inform the inventory tracking system. In another example, the guidance device may include a button which the associate presses when unloading or loading the container.

If the correct container was moved, the method 800 proceeds to bock 825 where the inventory tracking system updates the location of the packages in the container to indicate those packages have been unloaded from, or loaded into, the vehicle. However, if the correct container was not moved, the method 800 proceeds to block 820 where the inventory tracking system provides feedback to the loading associate to remedy the error using any of the techniques described above. For example, the gateway may inform the inventory tracking system that the wrong container is being moved, and in response, the inventory tracking system can provide feedback using a mobile device carried by the associate. Moreover, the gateway can use the light or audio speaker on the guidance device to inform the associate that the incorrect container is being moved.

Moreover, the method 800 can also proceed to block 820 after block 825. However, instead of instructing the associate to perform a remedial action, the inventory tracking system can provide confirmation that the action (e.g., loading or unloading the container) was performed correctly.

Figure 9:
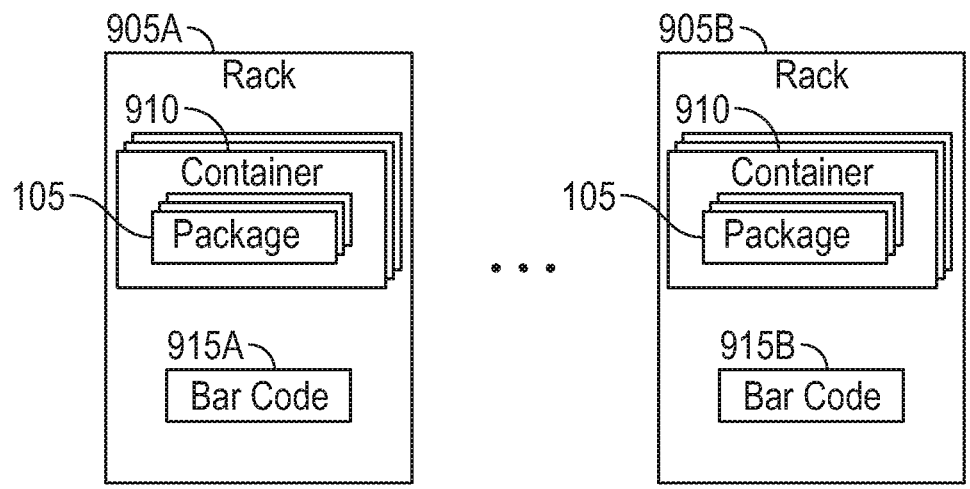
FIG. 9 illustrates staging racks using guidance devices, according to various embodiments.
Figure 9:
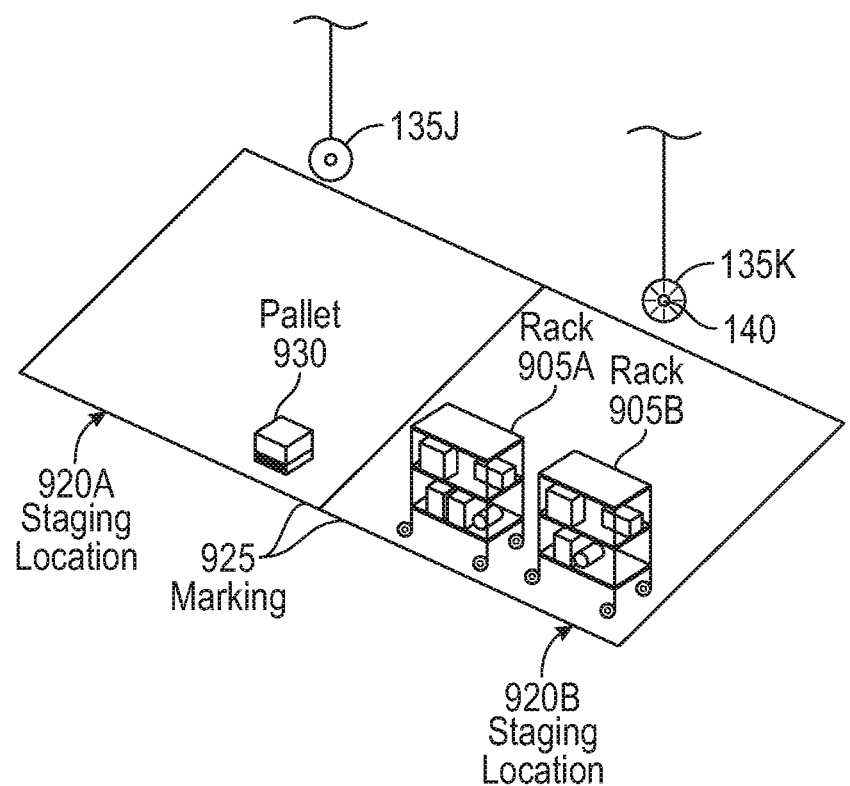

FIG. 9 illustrates transporting racks 905 using guidance devices 135, according to various embodiments. Specifically, FIG. 9 illustrates a rack 905A and 905B which include respective containers 910. In one embodiment, the racks 905 are moveable. For example, the racks 905 (or carts) can include wheels that permit an associate to transport the racks 905 around the warehouse. In another example, the racks 905 may include a reinforced base so that the rack 905 can be picked up and moved using a hand truck or motorized pallet mover. In one embodiment, the rack 905 can include a stack of shelves on which the containers 910 or packages 105 are placed.

In one embodiment, the racks 905 can be other types of containers like those described above such as a bulk box, a pallet, basket or bag. In these examples, the rack 905 can be carried by the associate or moved using a hand truck or pallet mover and may not contain separate containers 910 but only store packages 105.

In one embodiment, the racks 905 are located in sort areas in the warehouse. For example, the associates may use the racks 905 to store packages 105 assigned to a particular delivery route. For example, the rack 905A and 905B may be assigned to the same delivery route—i.e., the packages 105 stored on these racks 905 are delivered on the same route. An associate may have previously collected the packages 105 from different areas of the warehouse and placed the packages 105 in the racks 905A and 905B as instructed by the inventory tracking system. Although not shown, a guidance device may be mounted on the racks 905, or in the sort area that contains the racks 905, to aid the associates when stowing the packages 105 into the racks 905 similar to what is described in method 200.

The racks 905 also include respective bar codes 915A and 915B which can uniquely identify the racks 905. For example, when moving the racks 905, the associate may scan the bar codes 915A and 915B to inform the inventory tracking system which rack is being moved. Because the inventory tracking system was already informed which delivery route the associate is staging, the inventory tracking system can confirm whether the scanned rack 905 is assigned to that delivery route.

FIG. 9 also illustrates staging locations 920A and 920B for storing the racks 905 before being picked up by a delivery driver. In one embodiment, the associate moves the racks 905 from the sort area to one of the staging locations 920 for delivery. As shown here, the associate has moved the racks 905 into the staging location 920B. In one embodiment, the staging locations 920 are designated areas in the warehouse floor or in an outside area proximate to the warehouse (e.g., a landing or a covered parking lot). A marking 925 (e.g., tape, paint, reflective markers, and the like) is disposed on the floor of the warehouse to indicate the physical boundaries of the staging locations 920. Moreover, in one embodiment, bar codes uniquely identifying the staging locations 920 can be disposed around the periphery of the staging locations 920 such as on the marking 925 or on pedestals for easy access. For example, a bar code may be placed intermittently (e.g., every five feet) along the markings 925, or one bar code can be located on each side of the staging locations 920. In one embodiment, the associate scans the bar code corresponding to the staging location 920B after moving the racks 905 into the location 920B to inform the inventory tracking system of the rack's 905 new location.

In one embodiment, the guidance devices 135 are disposed in a fixed relative position relative to the staging locations 920. In FIG. 9, a respective guidance device 135 is suspended over each of the staging locations 920. For example, the guidance device 135J is suspended over the center of the staging location 920A while the guidance device 135K is suspended over the center of the staging location 920B. The guidance devices 135 may be hung high enough to avoid contacting the racks 905 or the associates moving in the staging locations 920 but still low enough to be easily seen by the associates.

In one embodiment, the inventory tracking system uses the guidance devices 135 to aid the associates in identifying the correct staging location when moving the racks 905. That is, unlike the embodiments above where the guidance devices are assigned to containers, here the guidance devices 135 are uniquely assigned to a region of the warehouse which has a defined boundary (e.g., as shown by the marking 925). The warehouse may include multiple gateways that are assigned to manage different sets of the staging locations 920 and the guidance devices 135. By identifying a staging location, the inventory tracking system can identify which of the gateways manages the guidance device assigned to that staging location.

As shown here, the inventory tracking system (using a corresponding gateway) illuminates the light 140 on the guidance device 135K indicating to the associate that the racks 905A and 905B should be moved into the staging location 920B. In contrast, the light 140 on the guidance device 135J remains off to indicate that the staging location 920A is not the correct staging location for the delivery route for those racks.

Because the guidance devices 135 are suspended in the air, the light 140 is viewable from multiple viewing angles from the warehouse floor. Visibility of the light 140 can be further enhanced through various means. For example, the light 140 may be an omnidirectional light disposed at the bottom of the guidance device 135. Alternatively or additionally, although one light 140 is shown in FIG. 9, the guidance devices 135 may include lights on multiple sides so that the associate can see at least one light regardless of the direction she approaches the staging location 920B.

In another embodiment, the inventory tracking system uses the guidance devices 135 to provide feedback to the associates. For example, after indicating to the inventory tracking system that the rack 905 is stored in the staging location 920B, the inventory tracking system can use the light 140 to inform the associate whether the staging location 920B is the assigned location for the delivery route. For example, a green light 140 indicates the staging location 920B is the assigned location while a red light 140 indicates that it is not. Additionally or alternatively, the guidance device 135K may output an audio signal indicating whether the staging location 920B is the assigned location of the delivery route for the packages on the racks 905.

Figure 10:
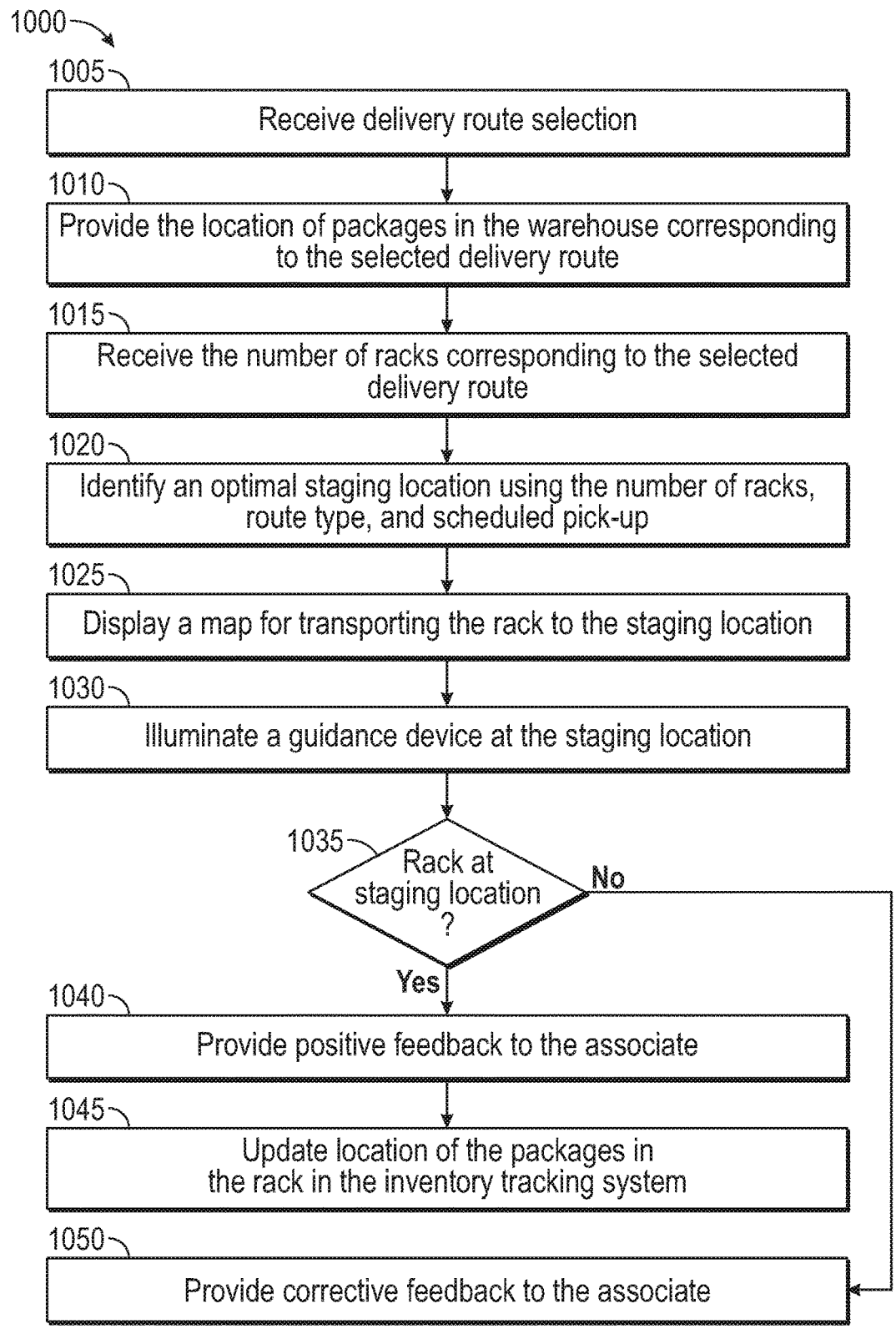
FIG. 10 is a flowchart for transporting a rack corresponding to a delivery route to a staging location, according to various embodiments.

FIG. 10 is a flowchart of a method 1000 for transporting a rack on a corresponding delivery route to a staging location, according to various embodiments. At block 1005, the inventory tracking system receives a delivery route selection from an associate (e.g., a package transport event). In one embodiment, the associate uses a personal electronic device such as a mobile phone, tablet, electronic watch, etc.

to select a delivery route from a plurality of delivery routes. However, in another embodiment, the inventory tracking system may assign a delivery route to an associate. For example, the associate may indicate she is done with her previous task and is available. In response, the inventory tracking system identifies a delivery route to assign to the associate. For example, the inventory tracking system may select the delivery route that is scheduled to be picked up the soonest to assign to the associate.

In one embodiment, the delivery route is a path to geographic region or location where the packages are shipped. The delivery route can include a single destination, e.g., another warehouse, or multiple destinations. For example, the delivery route may be all the packages with shipping addresses to the same zip code or to the same residential neighborhood. Alternatively, the delivery route may transport the packages to a warehouse operated by a third-party distributor who sorts the packages again and delivers them to the customers.

At block 1010, the inventory tracking system provides the location of the packages in the warehouse corresponding to the selected delivery route to the associate. In one embodiment, the packages may have already been stowed in a common sort area. For example, the associate may have already used the method 200 to retrieve packages from a conveyor belt and stow the packages assigned to the same delivery route in the same rack or container. The inventory tracking system may use the personal electronic device to inform the associate which sort area includes the packages for the delivery route. In another example, the inventory tracking system may provide an aisle number, row location, and/or column location of the rack containing the packages to the associate. Alternatively, the associate may retrieve the packages from different locations in the warehouse. Again, the inventory tracking system can use the electronic device to inform the associate where the different packages (or the racks containing the packages) are located.

Figure 11:
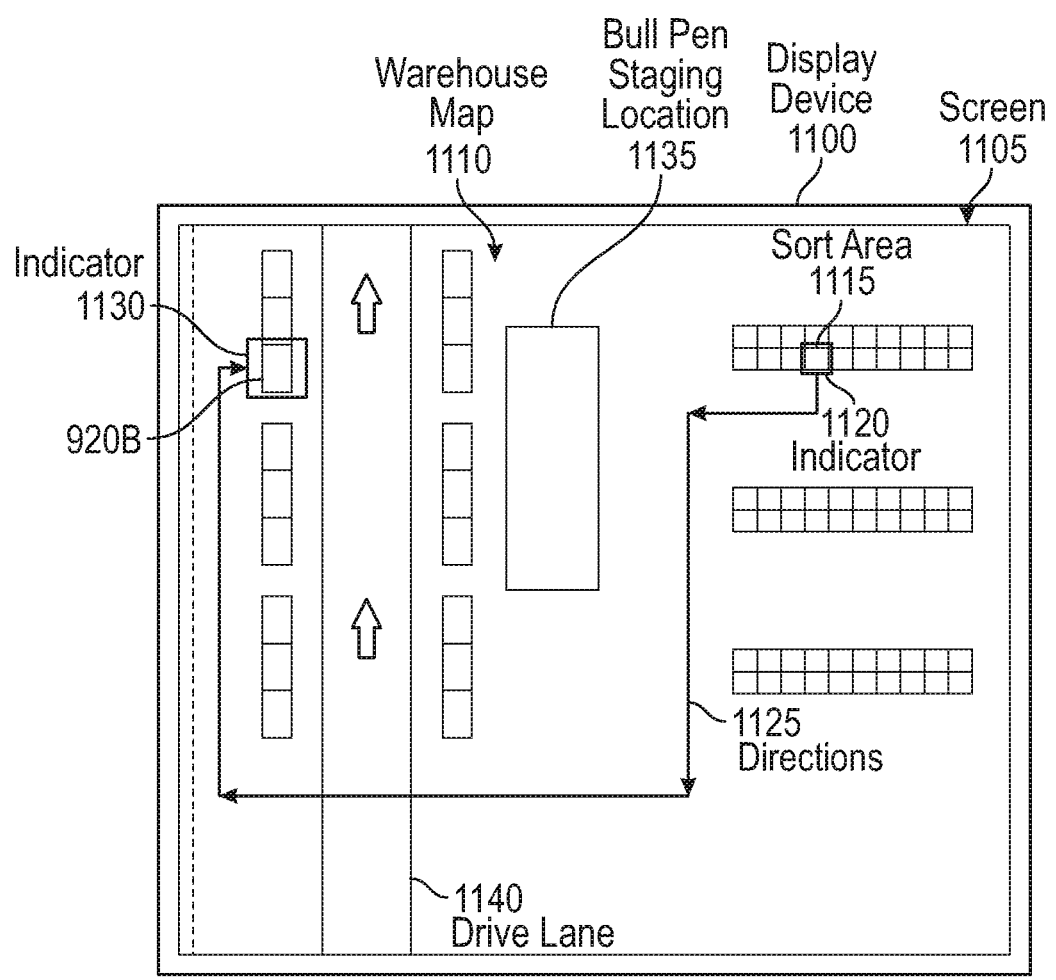
FIG. 11 illustrates displaying a map for transporting racks to a staging location, according to various embodiments.

In one embodiment, the electronic device displays a map 1110 indicating where the packages are located in the warehouse, as illustrated by FIG. 11. FIG. 11 includes a display device 1100 (e.g., a personal electronic device or a display device mounted on a motorized pallet mover) with a display screen 1105 for displaying the map 1110. In this example, the map 1110 provides a top down view of the warehouse.

The map 1110 includes an indicator 1120 that highlights a sort area 1115 that includes the packages for the selected delivery route. The display device 1100 may use bright or flashing colors for the indicator 1120 to highlight its location in the map 1110 to the associate. In this manner, the associate can quickly identify the location of the corresponding sort area 1115 in the map 1110.

In one embodiment, a guidance device is also disposed at the sort area 1115. For example, the guidance device may be suspended from the ceiling over the sort area 1115 similar to the guidance devices 135J and 135K suspended over the staging locations 920 shown in FIG. 9. After providing the location of the sort area 1115 to the associate, the inventory tracking system may also illuminate the guidance device assigned to the sort area 1115 to help the associate determine she has found the sort area 1115 indicated in the map 1110. In one example, the color of the indicator 1120 may match the color of the light illuminated by the guidance device in the sort area 1115. To avoid confusion, the inventory tracking system or gateway can ensure the color of the indicator 1120 is different from other colors being used by neighboring guidance devices at the same time.

Returning to the method 1000, at block 1015, the inventory tracking system is informed by the associate of the number of racks corresponding to the selected delivery route. Although the inventory tracking system may know the number of packages in the route, the inventory tracking system may not know the number of racks used to store those packages. That is, when collecting the packages into the sort area, the associates may have to use multiple racks to contain all the packages due to the number of packages, the shapes of the packages, and the stacking arrangement. Because of the way the packages are stored in the racks and because the shape and size of the packages can vary, delivery routes with the same number of packages may nonetheless have different numbers of racks.

When arriving at the sort area, the associate can inform the inventory tracking system of the number of racks present in the sort area. The inventory tracking system then uses this information to identify a staging location for the delivery route with sufficient available space to store the racks. For example, if the sort area includes more than three racks, the inventory tracking system may assign the delivery route to a larger staging location or select two neighboring staging locations.

In one embodiment, before moving the racks, the associate scans the bar code on the racks or a bar code in the sort area so that the inventory tracking system can determine whether the associate has found the correct racks for the delivery route.

At block 1020, the inventory tracking system identifies an optimal staging location (or locations) using the number of racks containing the packages, a route type, and a scheduled pick-up. In one embodiment, the route type is the estimated time needed to deliver the packages in a particular delivery route. For example, there may be 1-hour routes, 2-hour routes, 3-hour routes, etc. The different route types may be staged at different locations in the warehouse. That is, a driver who is picking up a 1-hour delivery route may drive to a different area of the warehouse than a driver who is picking up a 4-hour delivery route. Thus, the inventory tracking system may consider the route type when selecting the staging location.

Moreover, the scheduled pick-up is the time when the driver is expected to pick up the packages for delivery. For example, the associate may currently be staging a delivery route that is scheduled for pick-up in fifteen minutes. In that case, the inventory tracking system may select a staging location that is immediately adjacent to a drive lane where the driver can park her vehicle and load the packages. Alternatively, the delivery route may be scheduled for pick-up the next day. In this case, the inventory tracking system selects a bull-pen staging location which may be used to store racks from multiple delivery routes in a shared space. For example, the bull-pen staging location may be near the staging locations that are used for driver pick-ups. When the time for pick-up gets closer, the inventory tracking system may instruct an associate to the move the racks from the bull-pen staging location to one of the staging locations adjacent to where the driver can park her vehicle to load the packages.

The inventory tracking system can consider multiple factors (e.g., number of racks, route type, scheduled pick-up, and staging location availability) to select the staging location or locations. For example, if the delivery route is not scheduled for pick up until the next day but there is only one rack, the inventory tracking system may select a staging location that is adjacent to the drive lane rather than putting the rack in the bull-pen staging location since the rack can share the staging location with a rack or racks for another delivery route. However, if the delivery route contains multiple racks, the inventory tracking system may select the bull-pen staging location. In another example, the delivery route may be scheduled for pick up within an hour but there may not be any available staging locations adjacent to the drive lane that have sufficient space for the racks of the route. In that case the inventory tracking system may store the racks in the bull-pen staging location until a staging location near the drive lane is free. Alternatively, the inventory tracking system may select multiple staging locations and instruct the associate to put one of the racks in the delivery route in a first staging location and a second one of the racks in a second staging location.

At block 1025, the inventory tracking system uses a display device to display a map for transporting the rack (or racks) in the delivery route to the selected staging location. Referring again to FIG. 10, the map 1110 provides directions 1125 that indicate a path for moving racks in the sort area 1115 to the selected staging location 920B. The map 1110 includes an indicator 1130 highlighting the location of the staging location 920B in the map 1110 such as a bright or flashing color.

In this example, the selected staging location 920B is located adjacent to a drive lane 1140 where delivery drivers can drive their vehicles and park in order to load the packages from the racks in the staging locations 920. Although the drive lane 1140 is shown as being inside the warehouse, in other embodiments the drive lane 1140 may be outside the warehouse but may be covered to protect the packages from the weather. The staging locations adjacent to the drive lane 1140 may be reserved by the inventory tracking system for routes that are scheduled to be delivered within the next four hours. The inventory tracking system can use a bull-pen staging location 1135 for staging racks that are schedule to be delivered after four hours or if there are not sufficient space in the staging locations next to the drive lane 1140. Thus, the bull-pen staging location 1135 can serve as an intermediate or temporary staging location.

Although not shown, in one embodiment the warehouse may include multiple drive lanes 1140 where each drive lane 1140 is assigned to one or more route types. For example, a first drive lane (and its adjacent staging locations) may be assigned to 1-hour and 2-hour routes while a second drive lane and its adjacent staging locations are assigned to 3-hour and 4-hour routes.

Returning to the method 1000, at block 1030 the inventory tracking system illuminates a guidance device at the selected staging location. To do so, the inventory tracking system identifies which gateway manages the guidance device at the selected staging location and sends the identified gateway an instruction indicating an associate is transporting a rack to that location. In response, the gateway identifies the guidance device assigned to that staging location (e.g., the guidance device that is suspended over that location or is mounted on the floor at the location) and illuminates its light. Moreover, the inventory tracking system may inform the associate the color of light assigned to the delivery route via a personal electronic device. The inventory tracking system also informs the gateway the color of light assigned to the associate so that the gateway can instruct the guidance device to illuminate the same color.

Multiple associates may be in the process of transporting racks for different delivery routes to the same staging location. For example, especially for the bull-pen staging location which typically stores racks for multiple delivery routes, multiple associates may in the process of moving racks for different routes to the same location. The inventory tracking system can assign different color lights to the different associates. The gateway controlling the guidance device (or devices) suspended over the shared staging location may instruct the lights on the device to switch between all the colors at predefined time increments. For example, each half second the guidance device may switch to a different color. In another example, the guidance device may have multiple lights, and thus, can display different colors in parallel.

At block 1035, the inventory tracking system determines whether the associate has moved the rack assigned to the delivery route into the staging location. In one embodiment, block 1035 is performed after the inventory tracking system has received a prompt from the associate that she has moved one of the racks in the delivery route into the staging location. For example, each time the associate moves a rack into the staging location, she may scan the bar code on the rack and a bar code corresponding to the staging location. The inventory tracking system then determines, using the ID information from the bar code scans, if the rack was assigned to that staging location. Stated differently, the inventory tracking system determines whether the associate moved the correct rack (i.e., a rack containing packages for the selected delivery route) into the staging location selected for that delivery route.

If the correct rack was transported to the correct staging location, the method 1000 proceeds to block 1040 where the inventory tracking system provides positive feedback to the associate. The inventory tracking system can provide confirmation that the action (i.e., staging the rack for delivery) was performed correctly. For example, the inventory tracking system may cause an electronic device carried by the associate to emit a confirmation sound or vibrate to inform the associate the package was stowed correctly and the location of the package has been updated. In another example, the inventory tracking system can use the guidance device assigned to the staging location to provide the positive feedback. Once the associate has successfully moved all the racks into the shared staging location, the inventory tracking system can inform the gateway which then instructs the guidance device to stop illuminating the corresponding color. For example, consider a guidance device currently rotating between green-yellow-purple. Once the associate assigned purple finishes moving the racks for his selected delivery route into the staging location, the gateway instructs the guidance device to illuminate only green and yellow, thereby indicating to the associate assigned purple that she has completed the task. In another example, the guidance device may output an audio indicator to let the associate know the rack was staged correctly.

At block 1045, the inventory tracking system updates the location of the packages in the rack. For example, the inventory tracking system may assign the location of the packages in the rack to the location of the staging location in the warehouse.

If, however, the associate did not retrieve the correct rack or put the correct rack in the wrong staging location, the method proceeds from block 1035 to block 1050 where the inventory tracking system provides corrective feedback to the associate. In one embodiment, the inventory tracking system provides feedback using a personal electronic device carried by the associate. The device may inform the associate of the mistake and provide a remedial action such as retrieving the rack and providing directions from the current (incorrect) staging location to the correct staging location. Further, the corrective feedback may be provided by the guidance device which can flash the color assigned to the associate and output a harsh sounding noise to inform the associate the staging action was performed incorrectly.

Although the method 1000 was described in the context of an associate using an electronic device to select the delivery route, receive directions to the sort area and the staging location, and receive feedback, the embodiments herein are not limited to such. For example, an associate may receive a paper pick-list for a delivery route which indicates the location of the packages and the staging location for those packages. The pick-list could also include a map with directions from the sort area containing the packages to the staging location. One advantage of using an electronic device, however, is that the inventory tracking system can wait until the associate informs the inventory tracking system of the number of racks for the delivery route in order to select the optimal staging location.

Moreover, instead of using bar codes to determine whether the associate has picked up the correct racks from the correct sort area and moved those racks the selected staging location, the inventory tracking system may use different tracking technologies. For example, the packages or racks may include RFID tags and the sort area and the staging locations are within RFID read areas. As the associates moves the racks from the sort area to the staging location, the inventory tracking system can use the RFID read areas to automatically confirm the correct racks were moved into the selected staging locations (i.e., without relying on a prompt from the associate).

Figure 12:
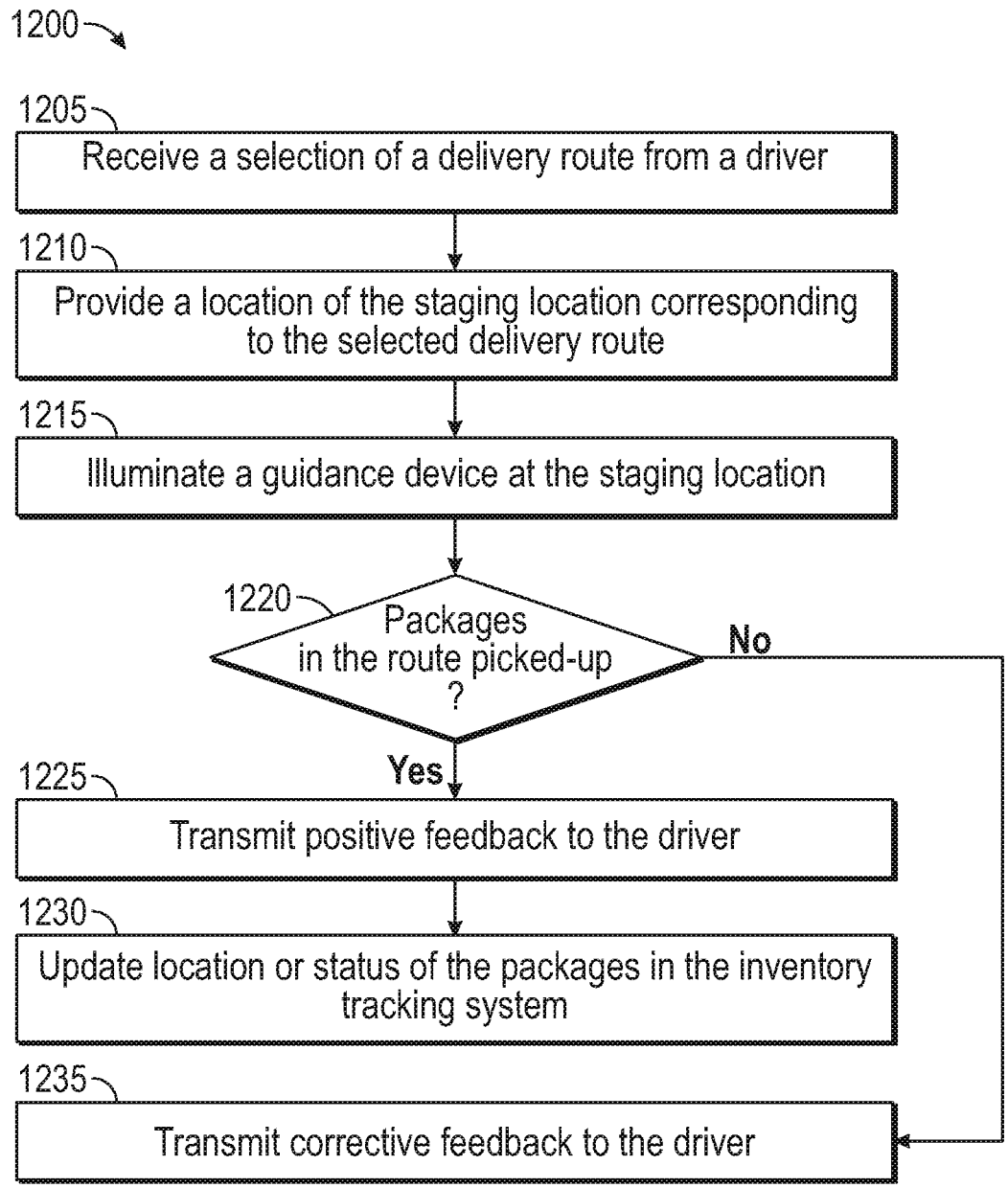
FIG. 12 is a flowchart for picking up packages from a staging location using a guidance device, according to various embodiments.

FIG. 12 is a flowchart of a method 1200 for picking up packages from a staging location using a guidance device, according to various embodiments. At block 1205, the inventory tracking system receives a selection of a delivery route from a driver (e.g., a package transport event). In one embodiment, the driver uses a personal electronic device (e.g., the hand held device 510 shown in FIG. 5) to select a route for delivery. In another embodiment, the driver may receive a paper manifest with a route. A bar code scanner or other electronic device may be used to inform the inventory tracking system that the driver was given the paper manifest.

At block 1210, the inventory tracking system provides a location of the staging location corresponding to the selected delivery route. In one embodiment, the inventory tracking system may use the driver's personal electronic device to display a map similar to the map 1110 in FIG. 11. The map may illustrate the location of the staging location on the drive lane 1140. If the driver receives a paper manifest, the manifest may indicate an ID of the staging location corresponding to IDs mounted in front of each staging location along the drive lane.

At block 1215, the inventory tracking system illuminates a guidance device at the staging location. In one embodiment, the same guidance devices used by the associate to move the racks into the staging location in the method 1000 can be used in the method 1200 to provide a visual indicator of the staging location for driver pick-up. Because multiple drivers can pick up different routes at the same time (e.g., multiple drivers can pick up packages using the same drive lane), the inventory tracking system can assign different color lights to prevent confusion.

The packages for a delivery route can be spread out over multiple staging locations. As such, the inventory tracking system and the gateway can ensure the guidance devices assigned to those staging locations display the same color light. Thus, the driver can easily determine all the staging locations that have packages assigned to her delivery route.

At block 1220, the inventory tracking system determines whether the driver picks-up packages assigned to her delivery route. That is, the system ensures the driver does not pick up packages assigned to a different route. In one embodiment, the driver scans bar codes on the rack (or on the individual packages) before loading the packages into the vehicle. By comparing identification data from bar code scans to a list of racks or packages assigned to the delivery route, the inventory tracking system can then confirm whether the driver retrieved the correct packages.

If the correct racks or packages are scanned, the method 1200 proceeds to block 1225 where the inventory tracking system provides positive feedback to the driver. The inventory tracking system can provide confirmation that the action (i.e., picking up the packages for delivery) was performed correctly. For example, the inventory tracking system may cause a personal electronic device carried by the driver to emit a confirmation sound or vibrate to inform the driver the scanned package was correct. In another example, the inventory tracking system can use the guidance device assigned to the staging location to provide the positive feedback.

At block 1230, the inventory tracking system updates the location of the packages. For example, the inventory tracking system may change the status of the packages from "staged for delivery" to "in transit for delivery."

If, however, the driver retrieved the wrong package, the method 1200 proceeds to block 1235 where the inventory tracking system provides corrective feedback to the driver. In one embodiment, the inventory tracking system instructs the driver's personal device to inform the driver of the mistake and provide a remedial action such as moving to the correct staging location. Further, the corrective feedback may be provided by the guidance device which can flash the color assigned to the driver and output an audible signal (e.g., a harsh sounding noise) to inform the driver the pick-up action was performed incorrectly.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be used to implement embodiments of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Aspects of the present disclosure are described with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

What is claimed is:

1. A package management system, comprising:
an inventory tracking system comprising a package database for tracking locations of a plurality of packages in a warehouse;
an event detecting device configured to detect a package transport event corresponding to a first package of the plurality of packages and transmit an indication of the event to the inventory tracking system, wherein the inventory tracking system accesses the package database to identify a staging location in the warehouse assigned to the first package, and wherein the staging location comprises a marked area of the warehouse; and
a gateway comprising a wireless transmitter, wherein the gateway is configured to:
receive an identification of the staging location from the inventory tracking system,
select a guidance device from a plurality of guidance devices in wireless range of the gateway based on the identification of the staging location, and
transmit a wireless signal to the selected guidance device uniquely assigned to the staging location using the wireless transmitter; and
wherein each of the plurality of guidance devices being disposed in a predefined spatial relationship with a respective staging location, wherein each of the plurality of guidance devices comprises a body containing a wireless receiver and a light, and wherein the selected guidance device is configured to receive the wireless signal and illuminate the light.

2. The package management system of claim 1, further comprising:
a plurality of gateways disposed at fixed locations in the warehouse, wherein each of the plurality of gateways is assigned to manage a different set of staging locations.

3. The package management system of claim 2, wherein the inventory tracking system is configured to identify the gateway from the plurality of gateways based on identifying the staging location.

4. The package management system of claim 1, wherein the gateway communicates directly with the selected guidance device when transmitting the wireless signal to the selected guidance device.

5. The package management system of claim 1, wherein each body of the plurality of guidance devices is suspended over its respective staging location, wherein the respective staging location includes a marking defining a boundary of the respective staging location on a floor of the warehouse.

6. A package management system, comprising:
an event detecting device configured to detect a package transport event of at least one package and transmit an indication of the package transport event to an inventory tracking system;
a gateway comprising a wireless transmitter, wherein the gateway is configured to:
receive an identification of a staging location corresponding to the package transport event from the inventory tracking system, wherein the staging location is a defined region in a warehouse,
select a guidance device from a plurality of guidance devices in wireless range of the gateway based on the identification of the staging location, and
transmit a wireless signal to the selected guidance device uniquely assigned to the staging location using the wireless transmitter; and
wherein each of the plurality of guidance devices comprises a body containing a wireless receiver and a light, wherein the selected guidance device is configured to receive the wireless signal and illuminate the light.

7. The package management system of claim 6, wherein the package transport event is a staging event during which a rack containing a plurality of packages is transported from a first area in the warehouse to the staging location, wherein the plurality of packages each comprises a shipping label with a mailing address.

8. The package management system of claim 7, wherein the staging event is detected when the event detecting device determines a user has selected a delivery route from a plurality of delivery routes, wherein the selected delivery route defines a geographic region to which the package should be delivered.

9. The package management system of claim 7, wherein the inventory tracking system is configured to, before transmitting the identification of the staging location to the gateway:
receive a number of racks corresponding to a delivery route from a user performing the staging event, wherein each of the racks contains multiple packages to be delivered on the delivery route; and
select the staging location from a plurality of staging locations based on the number of racks, wherein the staging location includes sufficient room for storing the racks.

10. The package management system of claim 9, wherein selecting the staging location from a plurality of staging locations comprises:
selecting the staging location based on a route type of the delivery route and a scheduled pick-up time of the delivery route, wherein the route type is assigned based on an estimated time required to complete the delivery route.

11. The package management system of claim 7, wherein the inventory tracking system is configured to provide a map for display, the map indicating a first location of the first area in the warehouse, a second location of the staging location in the warehouse, and directions from the first location to the second location.

12. The package management system of claim 6, wherein the inventory tracking system is configured to assign a color to the package transport event and inform a user of the assigned color which is the same color outputted by the light.

13. The package management system of claim 12, wherein the inventory tracking system is configured to determine that multiple package transport events are occurring simultaneously at the staging location and assign different colors to each of the multiple package transport events, wherein the gateway is configured to instruct the selected guidance device to output the different colors using the light.

14. The package management system of claim 6, wherein the package transport event is a pick-up event during which the package is retrieved from the staging location by a delivery driver and loaded into a vehicle.

15. The package management system of claim 6, wherein each body of the plurality of guidance devices is suspended over its respective staging location, wherein the respective staging location includes a marking defining a boundary of the respective staging location on a floor of the warehouse.

16. A method, comprising:
detecting a package transport event of at least one package and transmit an indication of the package transport event to an inventory tracking system;
receiving, at a gateway, an identification of a staging location corresponding to the package from the inventory tracking system, wherein the staging location is a defined region in a warehouse;
selecting a guidance device from a plurality of guidance devices based on the identification of the staging location, wherein each of the plurality of guidance devices is uniquely assigned to a respective staging location;
transmitting a wireless signal to the selected guidance device; and
illuminating a light on the selected guidance device.

17. The method of claim 16, wherein the package transport event is a staging event during which a rack containing a plurality of packages is transported from a first area in the warehouse to the staging location, wherein the plurality of packages comprises a shipping label with a mailing address.

18. The method of claim 17, wherein the staging event is detected when the event detecting device determines a user has selected a delivery route from a plurality of delivery routes, wherein the selected delivery route defines a geographic region to which the package should be delivered.

19. The method of claim 18, further comprising, before transmitting the identification of the staging location to the gateway:
receiving a number of racks corresponding to the selected delivery route from the user performing the staging event, wherein each of the racks contains multiple packages to be delivered on the selected delivery route; and
selecting the staging location from a plurality of staging locations based on the number of racks, wherein the staging location includes sufficient room for storing the racks.

20. The method of claim 16, wherein the selected guidance device is suspended over the staging location, wherein the staging location includes a marking defining a boundary of the staging location on a floor of the warehouse.

* * * * *